(12) United States Patent
Herzog et al.

(10) Patent No.: US 6,962,267 B2
(45) Date of Patent: Nov. 8, 2005

(54) AUTOMATED SHOPPING SYSTEM

(76) Inventors: Hettie J. Herzog, 1057 St. Matthews Rd., Chester Springs, PA (US) 19425; Bradley R. Hardwick, P.O. Box 269, Ewan, NJ (US) 08025-0269

( * ) Notice: Subject to any disclaimer, the term of this patent is extended or adjusted under 35 U.S.C. 154(b) by 0 days.

(21) Appl. No.: 10/877,941

(22) Filed: Jun. 26, 2004

(65) Prior Publication Data

US 2005/0189364 A1   Sep. 1, 2005

Related U.S. Application Data

(62) Division of application No. 09/791,270, filed on Feb. 22, 2001, now Pat. No. 6,755,322.

(60) Provisional application No. 60/184,123, filed on Feb. 22, 2000.

(51) Int. Cl.[7] .............................................. G07F 11/00
(52) U.S. Cl. ........................................ 221/85; 221/130
(58) Field of Search ............................ 221/84, 85, 130, 221/131, 123, 253, 9, 13; 198/817; 414/278, 414/281

(56) References Cited

U.S. PATENT DOCUMENTS

6,808,082 B2 * 10/2004 Ohkubo ...................... 221/123

* cited by examiner

*Primary Examiner*—Kenneth Noland
(74) *Attorney, Agent, or Firm*—Laurence Weinberger

(57) ABSTRACT

A vending machine for the sale of both food and non-food products has a plurality of adjustable shelves and adjustable product dividers. Products are dispensed from the shelves by the action of a computer controlled transporter mounted on carriages permitting movement of the transporter both horizontally and vertically in an X-Z plane across the face of the product shelving. Rotation of the transporter in front of a selected product engages a product delivery mechanism which gently and safely slides the product off the shelf onto the transporter. A movable wall within the transporter pushes the delivered product aside, thereby clearing the way for the dispensing of additional products. Multiple products may safely be collected in each cycle. Products are carried to a delivery station for retrieval by the customer. After product delivery, the transporter is discharged of any residual items.

8 Claims, 19 Drawing Sheets

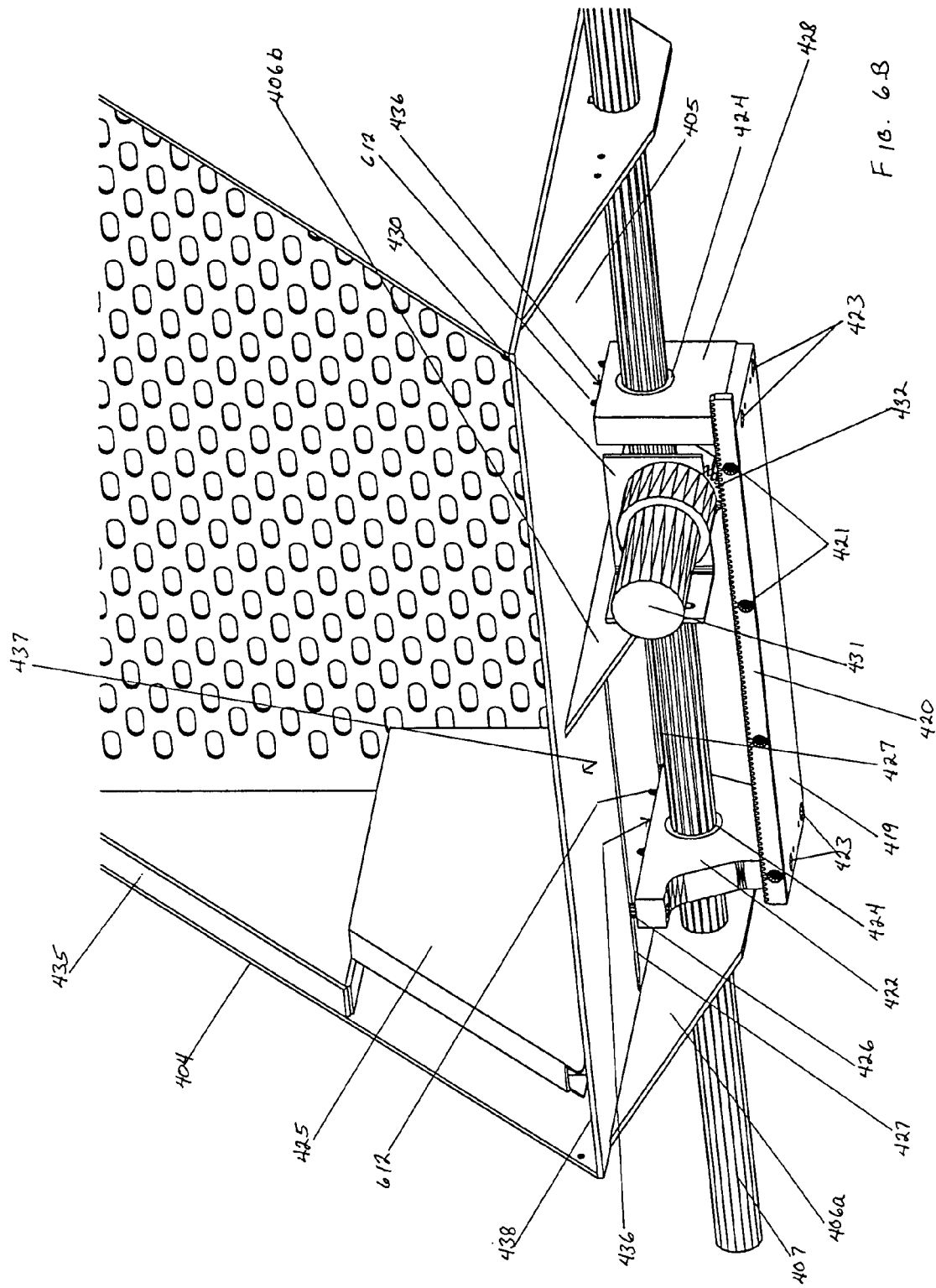

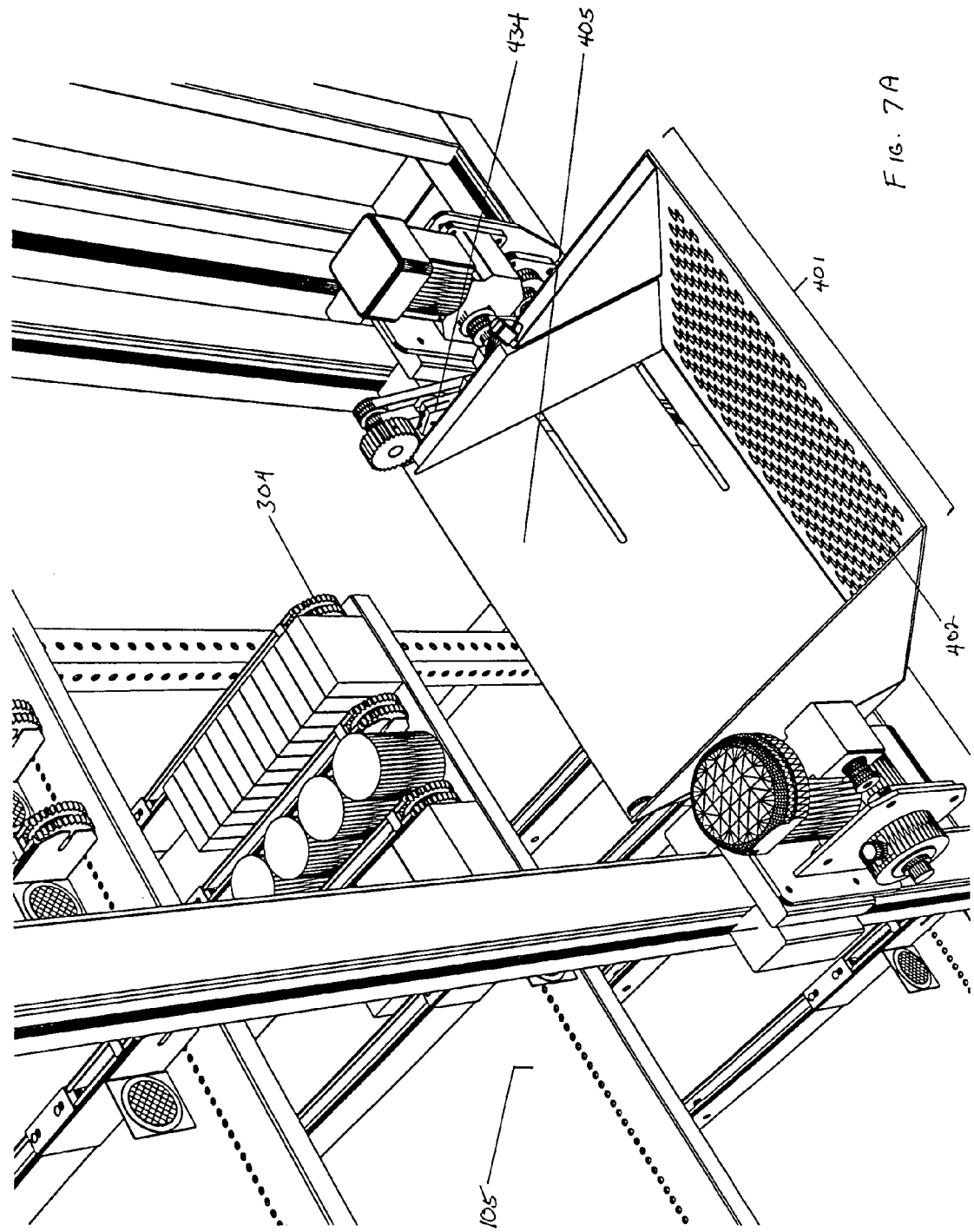

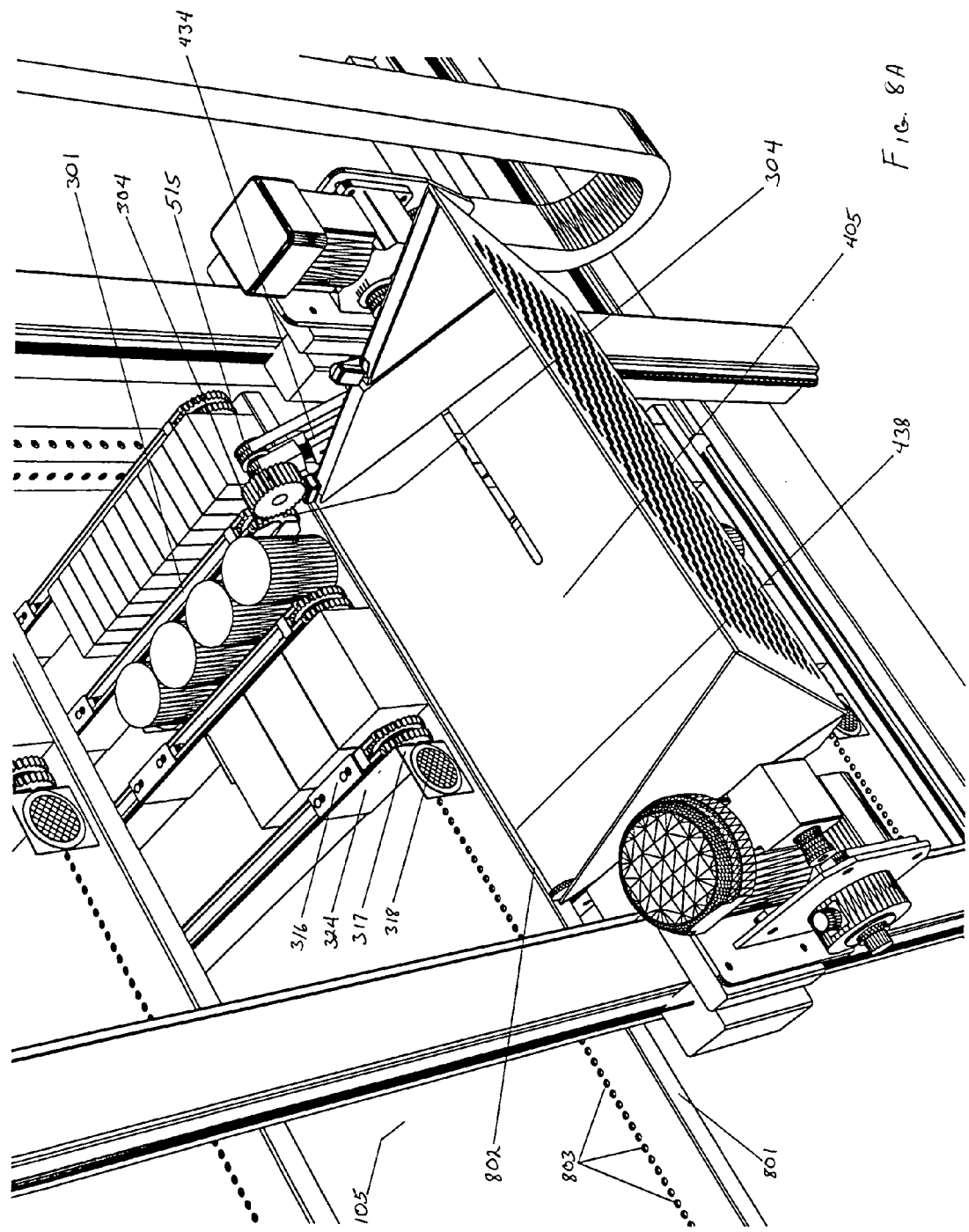

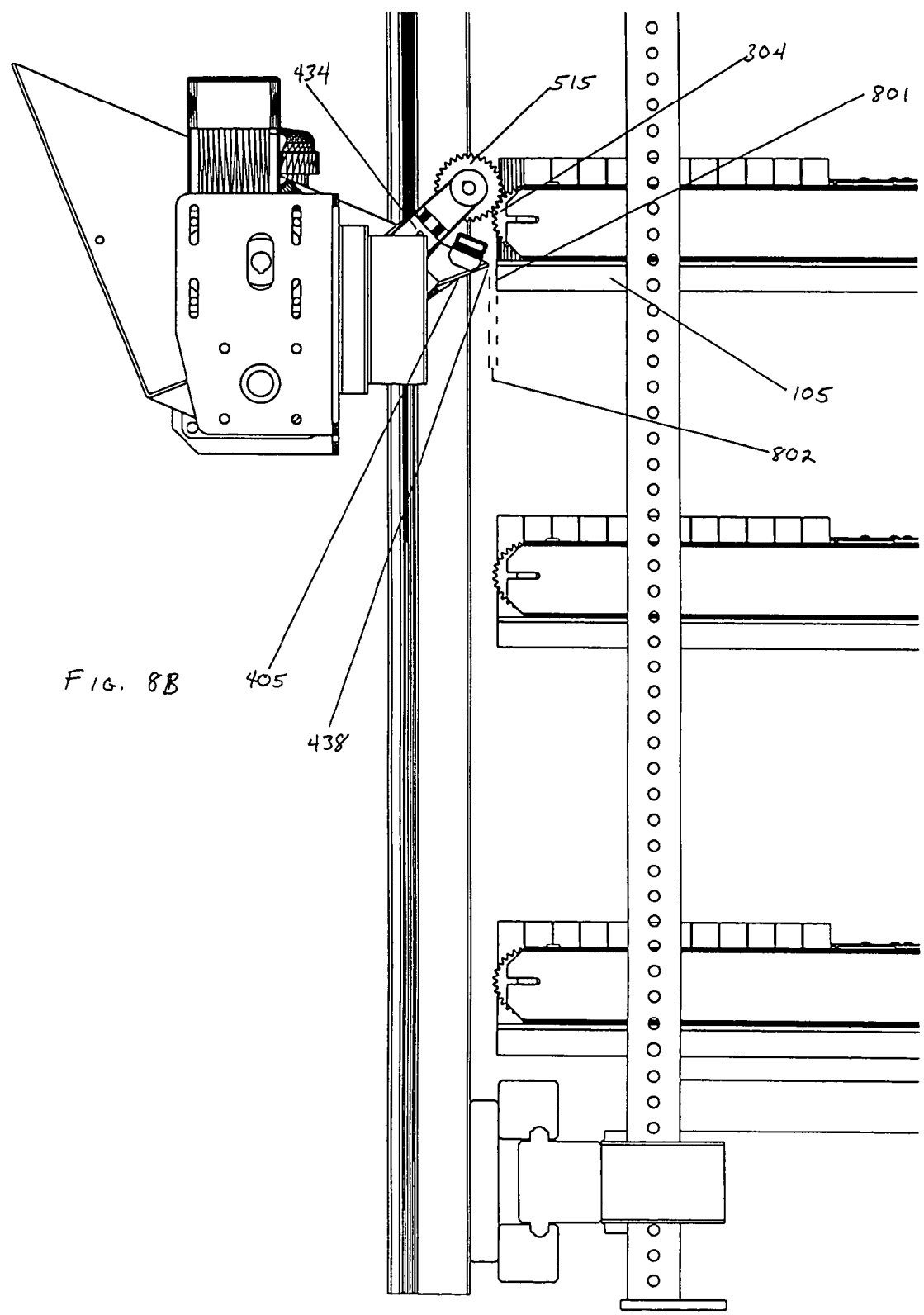

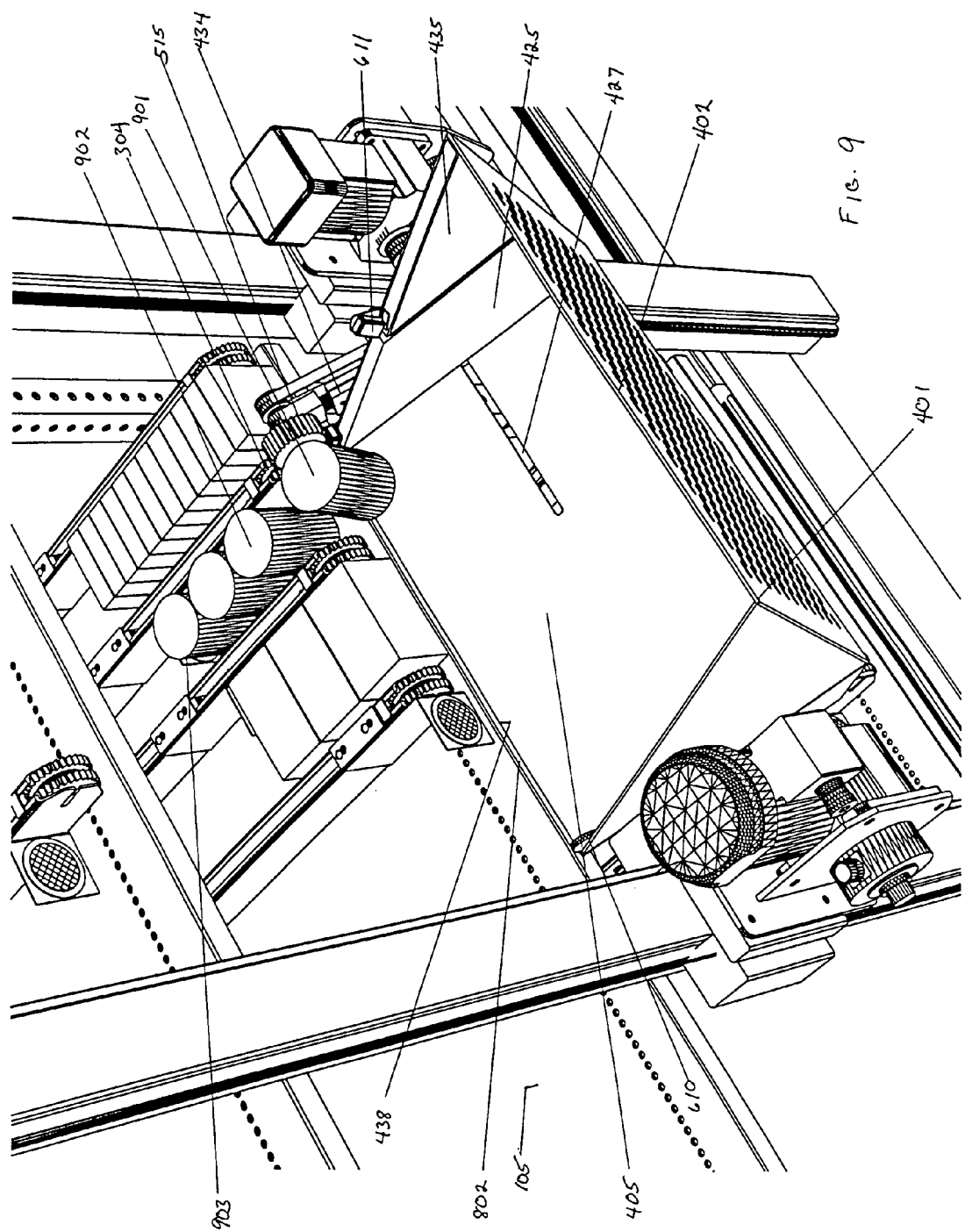

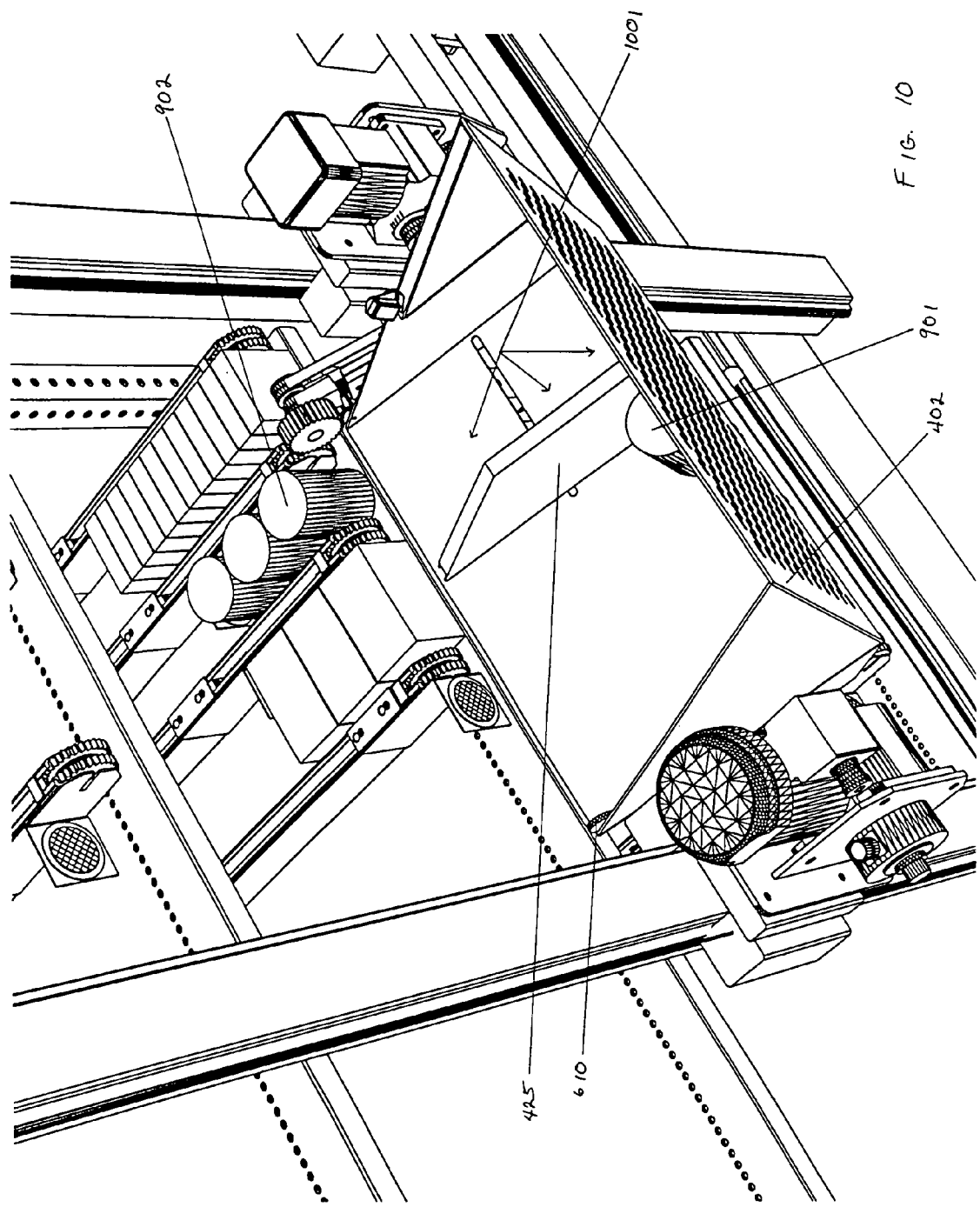

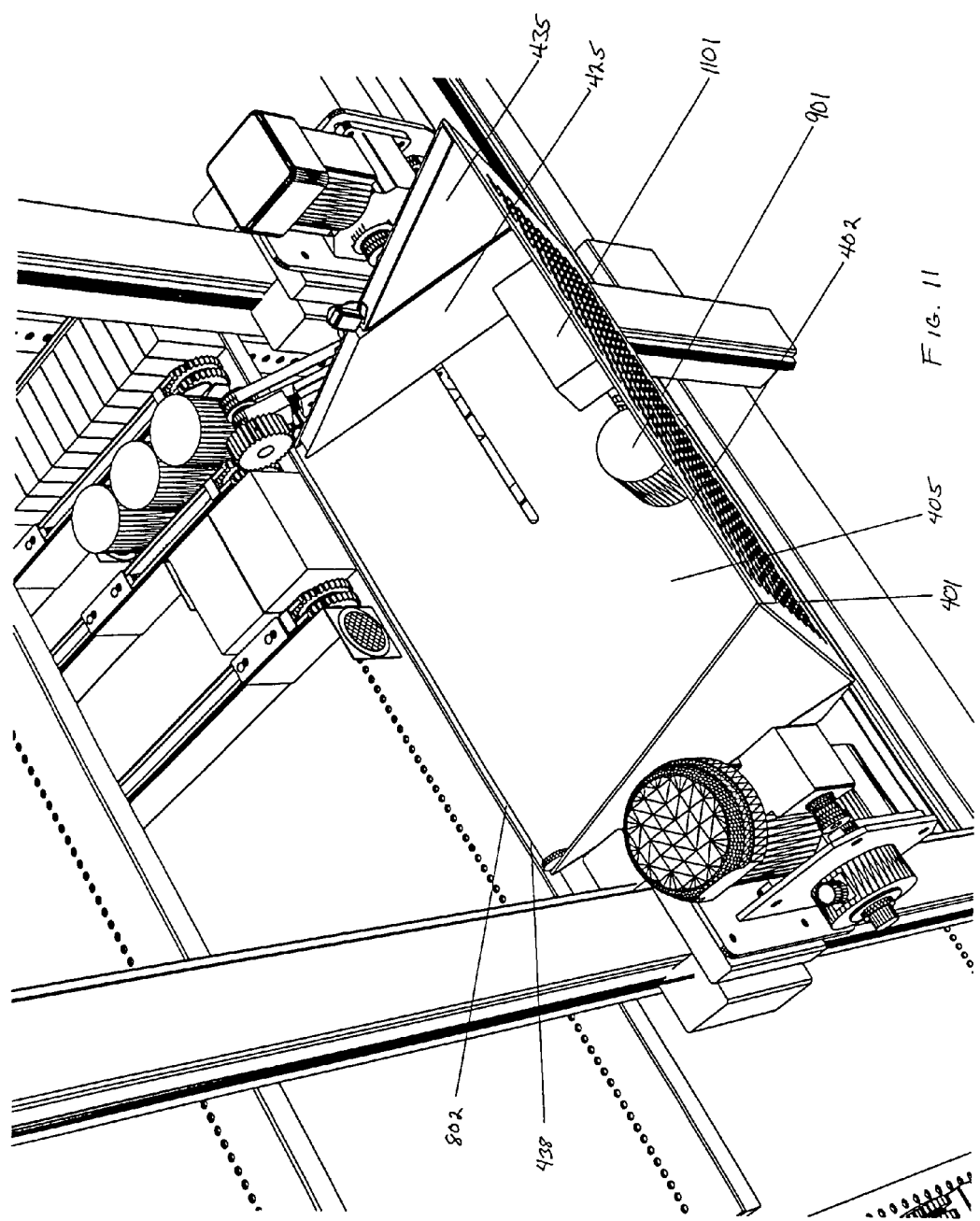

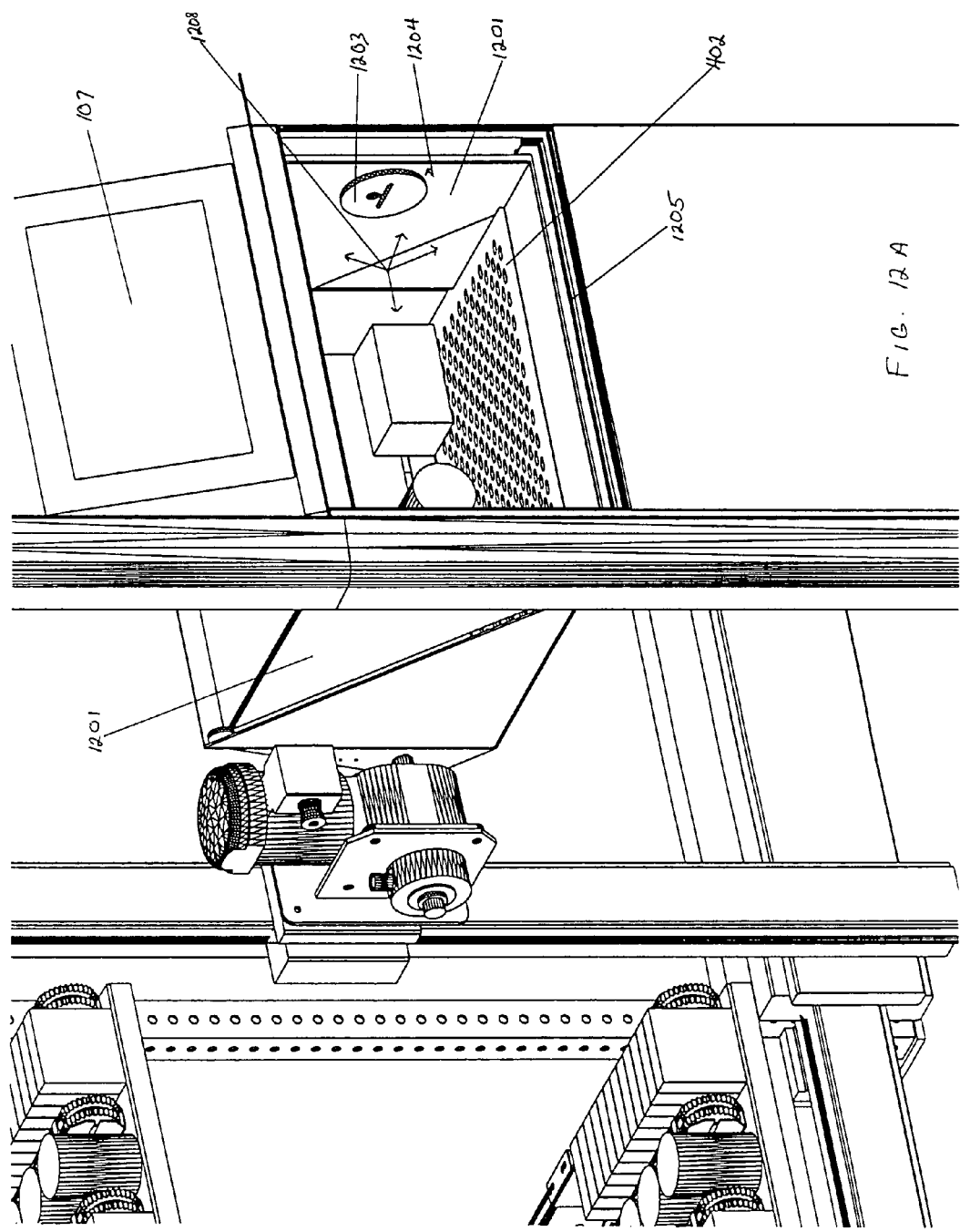

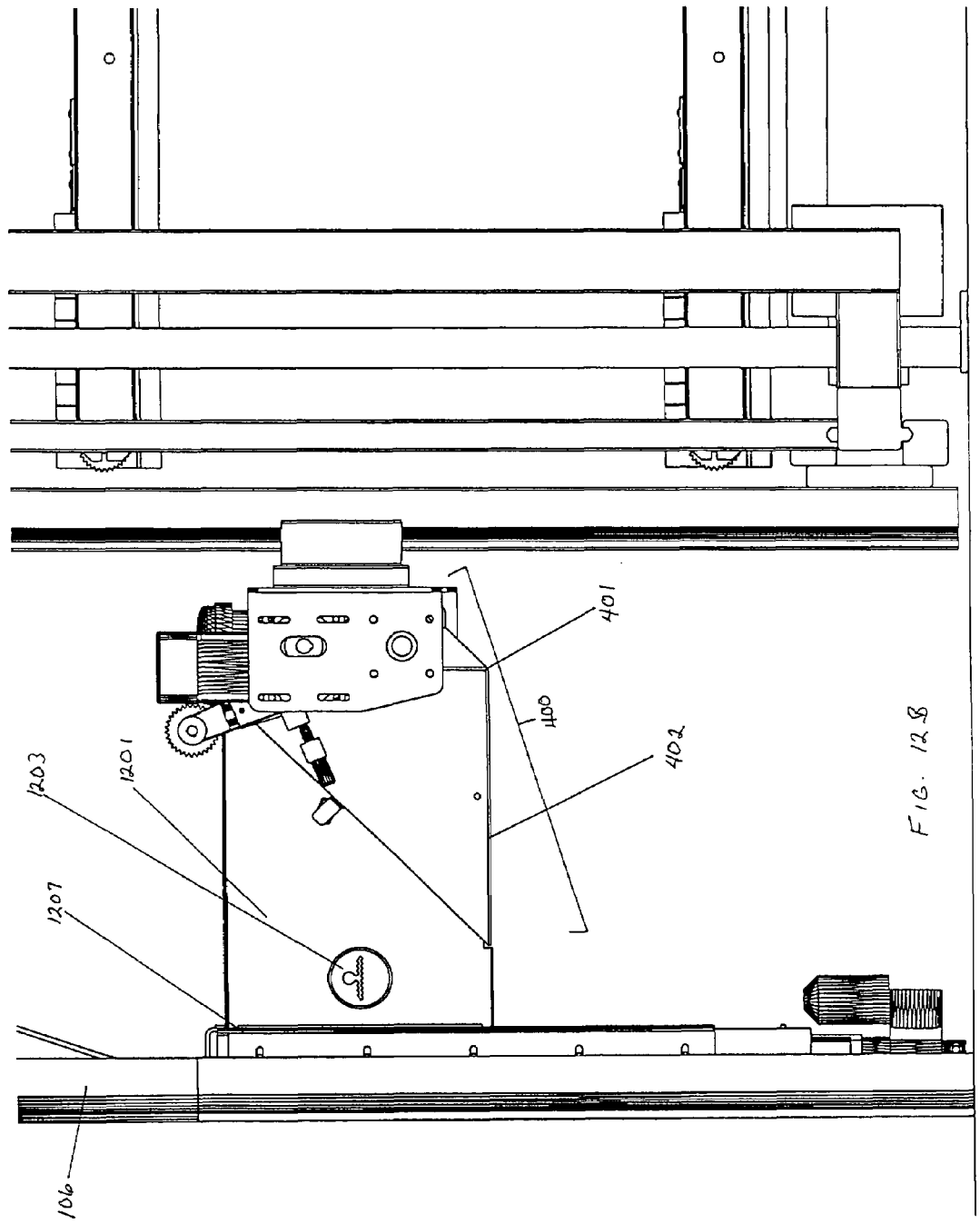

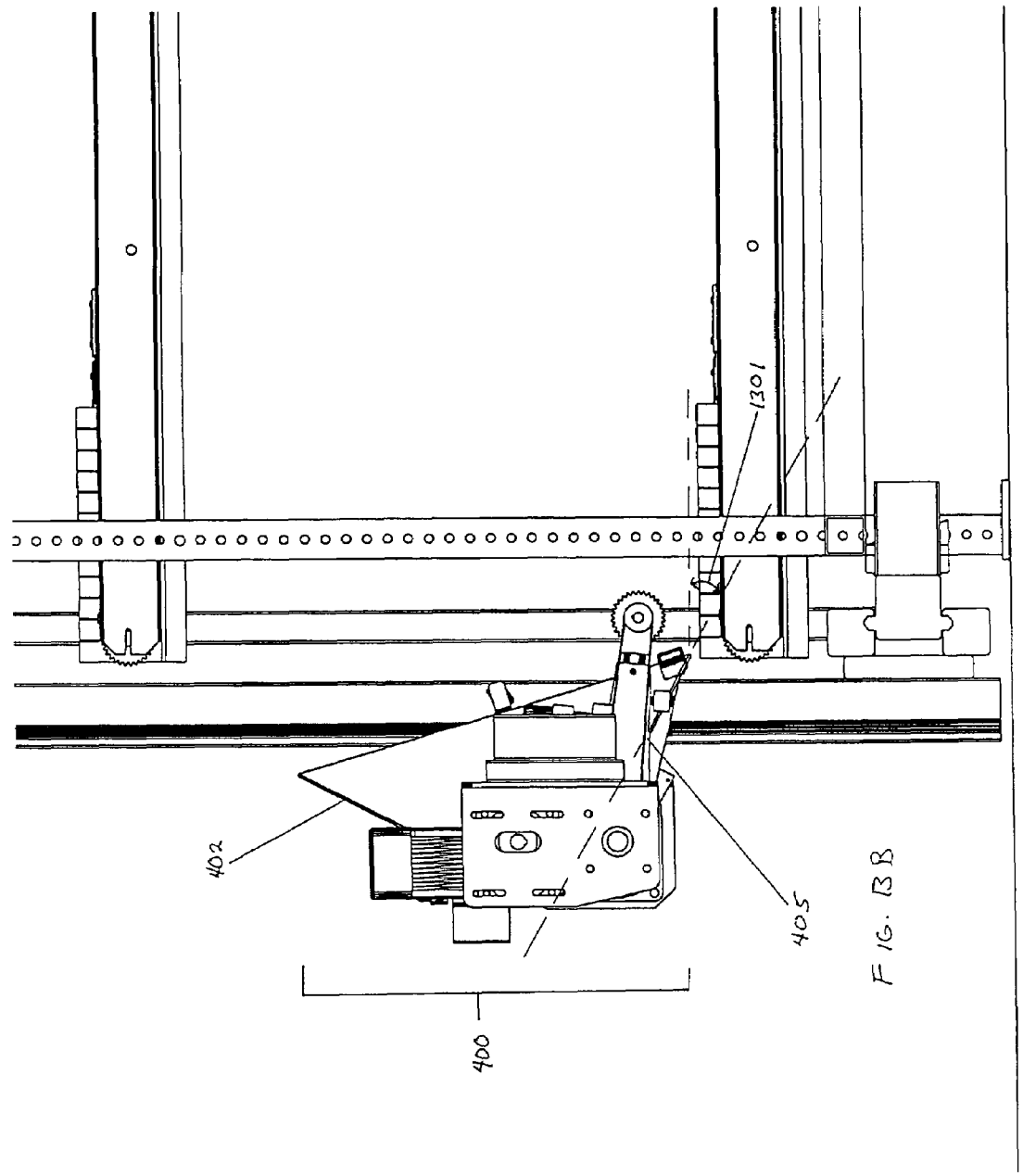

AUTOMATED SHOPPING SYSTEM

BACKGROUND OF THE INVENTION

This is a divisional application of U.S. application Ser. No. 09/791,270 filed Feb. 22, 2001 now U.S. Pat. No. 6,755,322 presently allowed and awaiting issue. Benefit of U.S. Ser. No. 60/184,123 filed on Feb. 22, 2000 is claimed.

FIELD OF THE INVENTION

The present invention is a large scale vending machine permitting unattended purchase of a wide variety of food and non-food products, including those requiring refrigeration, typically found in convenience, grocery, and other retail stores. More specifically, the vending machine utilizes a transporter to remove both large and small products of different shapes and packaging materials, including fragile products, from the shelving for delivery to a customer access door.

BACKGROUND OF THE INVENTION

Vending machines have always served the purpose of providing an around-the-clock shopping alternative, but until recently, the quantity and assortment of items has been limited. Small packages of cigarettes, candy, beverages, and snack foods have traditionally made up over 90% of all vended products. Vending machines allow retailers to offer products for sale without the necessity of a clerk or cashier present in locations where it is not physically possible or economically sensible to establish a store. Vending machines offer the consumer quick and convenient access to products around-the-clock.

Over the years, vending machines have been designed and constructed to deliver a specific item or a small range of items. Generally, the products vended were relatively small and uniform in size and were dispensed by gravity feed to a customer access area. Alternative delivery systems, which could handle a variety of product sizes, moved the products into alignment with a customer access door.

Convenience is a driving factor in consumer's decisions where to purchase goods and services, and they want speed and efficiency in performing basic tasks so that they have more leisure time. Providing a large variety of products required for daily living in a vending machine where the consumer lives, works, or plays, and delivering them without damage, would satisfy consumer demand for more convenient shopping. However, the number, variety, and differing size of articles requires a vending machine capable of individualized handling of the articles. Several prior art systems have been developed to deliver articles from shelving to a customer access area. Generally the articles are arranged on vertically stacked shelves with individual article types separated into rows. Thus, a matrix of accessible articles is formed. Articles are ordered through input devices which also have associated devices to charge for the purchase. Generally, credit cards, debit cards, and cash are accepted. The location of each article is provided to an electronic controller, typically a microprocessor, which directs the retrieval of the articles by a transporter system.

In U.S. Pat. No. 3,294,282 Brown discloses storage of articles between parallel adjustable spaced guide rails on each vertically stacked shelf. To retrieve an article an elevator rises to the appropriate shelf level. The selected article is moved by a motor driven tape which pushes the end article in a row onto the elevator. The elevator surface is itself a conveyor belt which moves the article to a delivery platform at one end of the elevator. The elevator then lowers so that the delivery platform is adjacent a customer delivery access door. One article at a time can be delivered. Different articles are accommodated either on different levels or in different racks on the same levels if separate drive tapes are provided.

In U.S. Pat. No. 4,108,333 endless conveyor belts running rear to front on each shelf support the articles to be dispensed. Multiple belts may be located on each shelf. An elevator which is as wide as the shelves is moved vertically. The elevator has a bottom which is inclined downwardly rear to front forming a gentle slope with a stopping barrier at its lowermost edge. The elevator can swing through a small arc and is held upright for vertical travel. A spring bias permits the elevator mechanism to detent at the selected level to stop. The elevator is swung slightly towards the shelf so that its rear edge is closely adjacent the forward end of the conveyor belt and the elevator engages a clutch which activates the conveyor belt. Articles are dispensed onto the elevator by the movement of the conveyor belt. On the elevator articles slide down the inclined bottom until stopped. The elevator then returns to the customer access area. A sensor which detects articles on the elevator may be used to lock further elevator movement until the article is removed.

For a vending machine designed to heat and deliver food, Friberg in U.S. Pat. No. 4,762,250 discloses a carriage which is moved vertically and laterally by motor drive screw spindles so that a tilted chute is aligned with the edge of a storage shelf adjacent the row of a selected item. A pusher mechanism propels the item off the end of the shelf so that it slides down the chute to a stop. The carriage returns to a delivery position where the article is deposited on a shelf and subsequently moved into a microwave oven cavity. After heating, the article is delivered to a customer access door.

To dispense video cassettes, O'Neil, in U.S. Pat. No. 4,812,629, teaches arranging the cassettes in specialized boxes stored in a 2D array in which only one box occupies each matrix position. Horizontal and vertical motors move a carriage into alignment with each position. On the carriage grasping fingers located on a shuttle belt engage a bar on the special cases. Movement of the belt withdraws the cassette onto the carriage which then returns to position opposite a customer access door.

For a kiosk designed to dispense a large number of non-uniformly packaged goods, Steury discloses in U.S. Pat. No. 5,499,707 a carriage driven by X-Y drive motors to a point opposite an appropriate article-containing drawer on a shelf. Specialized drawers, sized to the article to be dispensed, have no bottoms and dividers to separate the articles in each drawer. An electromagnet on the carriage engages a steel plate on the drawer and pulls the drawer out from the edge of the shelf. Articles in the drawer fall into the carriage receptacle. The control electronics withdraw the drawer a distance sufficient to obtain only the number of items needed. Several items can be obtained from different drawers before the carriage is returned to a customer accessible door.

A room sized vending machine capable of storing a large variety of differently sized articles is disclosed by Kanatsuka in U.S. Pat. No. 5,791,512. Again, articles are arranged in rows from front to back on a matrix of shelves. Each shelf is tilted downward at its front so that the articles slide against a stop at the lowest position of the shelf. A bucket is moved by X-Y motors across the array until opposite a selected item. Actuation of a motor on the bucket presses a stopper on the shelf which releases one article into the bucket. Additional articles are prevented from sliding off the shelf by a second stopper which is simultaneously inserted behind the article being dispensed. Several articles may be dispensed into the bucket before the bucket returns to a customer access area where the items are dropped into the access area by the opening of a bottom plate in the bucket.

BRIEF DESCRIPTION OF THE FIGURES

FIG. 6B is a partially cut away view showing the mounting of the product slider and drive rack.

FIG. 7A shows an oblique view of the transporter assembly on the gantry tilted in its travel position in front of product shelves.

FIG. 8A shows an oblique view of the transporter assembly tilted for product delivery with pusher arm gear engaged with the product pusher gear pulley. FIG. 8B is a partially cut away side view showing the tilt of the transporter bin in the dispensing position.

FIG. 9 shows a product box being dispensed into the transporter bin by action of the product pusher.

FIG. 10 shows the movable plate pushing the product over in the transporter bin after the product has been dispensed from the shelf.

FIG. 11 shows multiple products which have been dispensed into the transporter bin.

FIG. 12A is an oblique view showing the transporter assembly rotated and docked at the access door where the customer can retrieve the selected products. FIG. 12B is a partially cut-away side view of the docked transporter assembly.

FIG. 13B is a partially cut-away side view of the transporter bin in the discharge position.

DETAILED DESCRIPTION OF THE INVENTION

The vending machine of the present invention has the capability of vending products from display shelves where the product size varies over a wide range from relatively small to fairly large. Examples of small products would be photographic film, medicine boxes, and cans of juice. Examples of larger products would be 12 pack cases of soda, gallon milk containers, and 2 liter upright beverage containers. The design of the vending machine permits products of different sizes to be vended on the same product delivery cycle. In addition, the vending machine can deliver products which are fragile such as packs of eggs or glass containers. Further, the vending machine can vend just one product or many products at a time. Food as well as non-food products can be vended. These capabilities are made possible by use of the transporter bin and the associated product pusher of this invention.

A transaction center is provided at which a customer may input his/her selection of products and pay for them either in cash or by use of a credit card. Communication access is provided to: 1) verify and authorize customer credit transactions; 2) to report sales, cash and inventory status; and 3) to report any trouble encountered by the machine. Once the products are selected, a computer controls the movement of the transporter assembly to obtain and deliver the selected products to the customer. The arrangement of the elements of the vending machine will first be described followed by a description of its mode of operation.

Since the vending machine is designed to vend larger sized products, the storage shelves to contain these items must necessarily be relatively large. Accordingly, the vending machine may occupy a small room, typically about 18 ft. long, 9 feet deep, and 10 feet high. The dimensions may vary according to the number and size of the items to be vended. The machine may be built into an existing room or stand alone. In the preferred embodiment, the machine consists of a stand-alone self-contained unit. The unit may be refrigerated if items are vended which would spoil if not cooled. Power and communication lines are provided. All references to front, back, left, and right in the following description refer to the vending machine elements as seen from the purchaser's viewpoint facing the vending machine.

Figure 1:
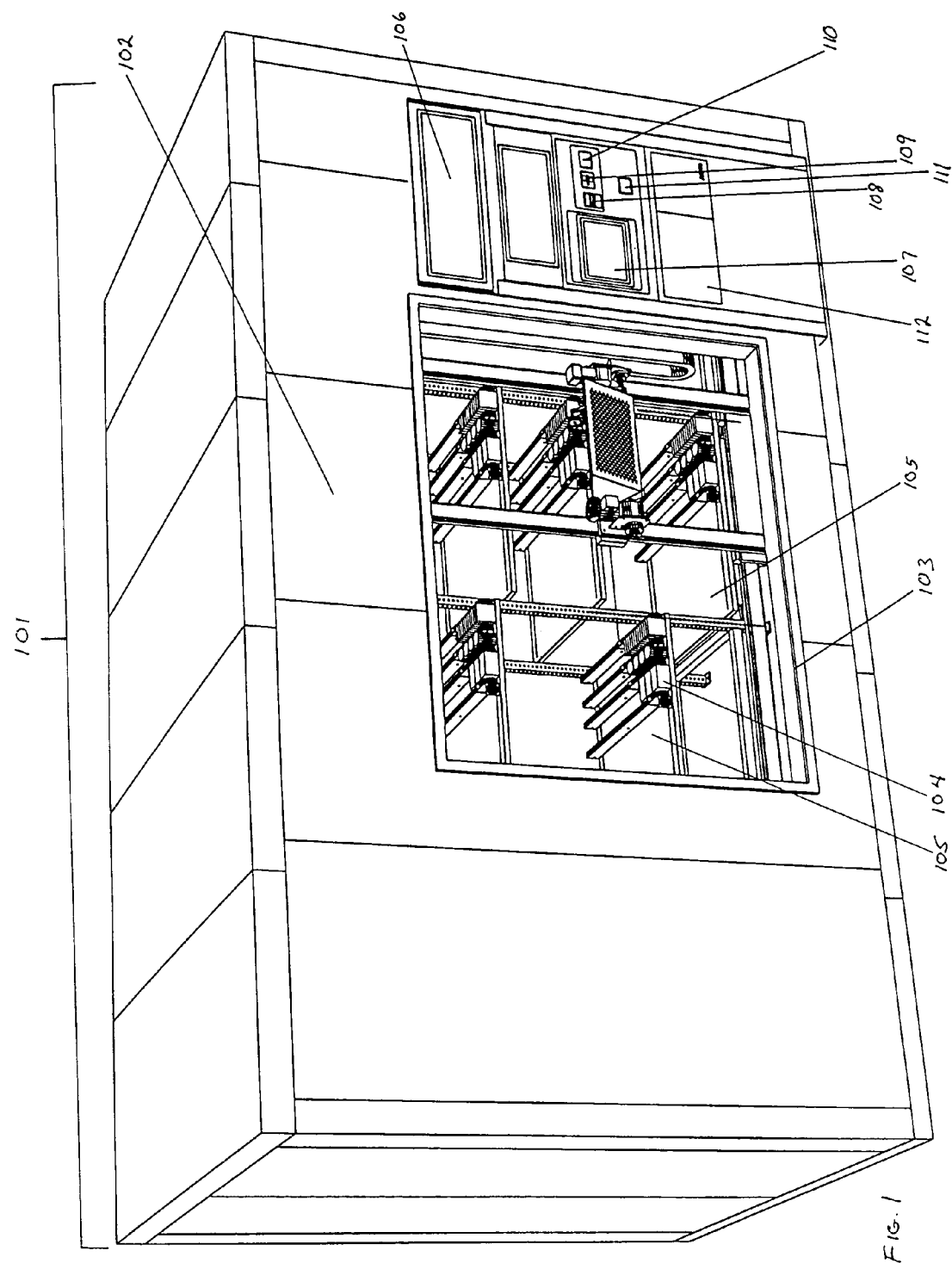
FIG. 1 shows a front view of the vending machine including a product display window and transaction station.

In the following figures, like reference numerals in the various figures refer to the same part. FIG. 1 shows the stand alone vending machine 101. A front wall 102 contains a window 103 through which the products 104 to be vended can be seen arranged on a plurality of shelves 105. A transaction center 106 may contain a touch sensitive display screen 107 and various transaction devices such as a bill acceptor 108, credit card reader 109, coin receptor and validator 110, receipt printer and coin return chute 111. Such transaction centers are well known in the art. Below the transaction area is an access door 112 through which the vended products are delivered to the customer.

Figure 2:
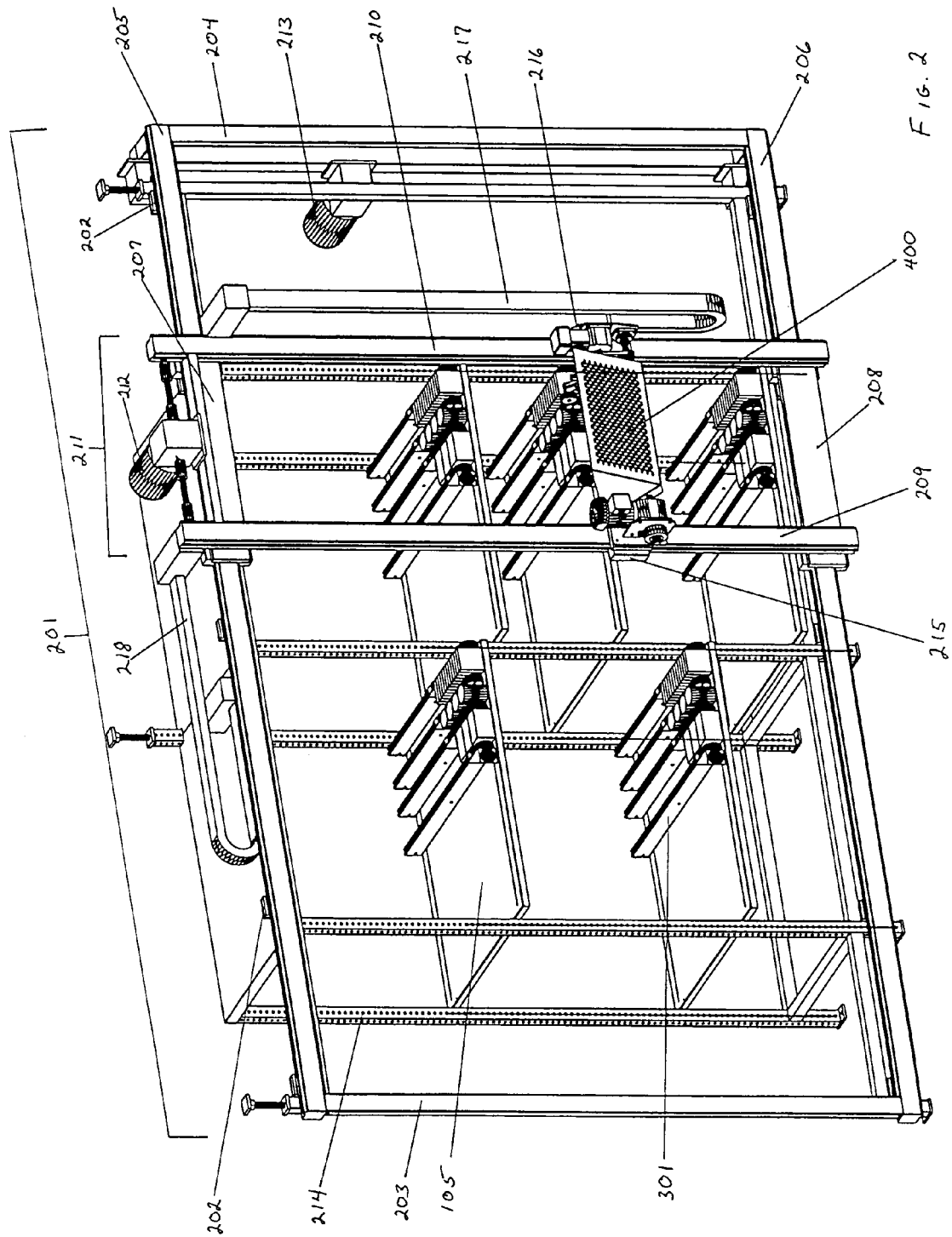
FIG. 2 shows an oblique view of the transporter gantry attached to product shelving with products arranged on the shelves separated by product separator/pushers.

As seen in FIG. 2, located between window 103 and shelves 105 is a rigid gantry 201. Gantry 201 consists of left and right vertical members 203 and 204 and top and bottom horizontal members 205 and 206. Gantry 201 is fixed by brackets 202 to shelf frame 214 which rests upon and is attached to the floor of vending unit 101. Horizontal members 205 and 206 provide tracks in which ride a top carrier 207 and a bottom carrier 208. Carriers 207 and 208 are connected by left and right vertical members 209 and 210. Carriers 207 and 208 along with vertical members 209 and 210 define a carriage 211 which may be moved left and right horizontally through a system of belts (not shown) by carriage motor 213 across the face of gantry 201 in front of shelves 105. Two movable carriages 215 and 216 are located in tracks in vertical members 209 and 210 and connected through belts (not shown) to vertical drive motor 212. Transporter bin assembly 400 attaches to carriages 215 and 216 and spans vertical members 209 and 210. Transporter bin assembly 400 may be moved vertically by drive motor 212. By actuating horizontal carriage motor 213 and vertical drive motor 212 appropriately, transporter bin assembly 400 may be moved across the entire face of gantry 201 in front of shelves 105. The position of transporter bin assembly 400 at any time is defined by a set of X-Z coordinates within gantry frame 201. Rotary encoders (not shown) on the vertical and horizontal motors provide information about the X-Z position of transporter bin assembly 400 to the control computer. Flexible cable carriers 217 and 218 house the electrical cables required to control both the vertical movement of transporter assembly 400 and the operation of transporter assembly 400.

Figure 3:
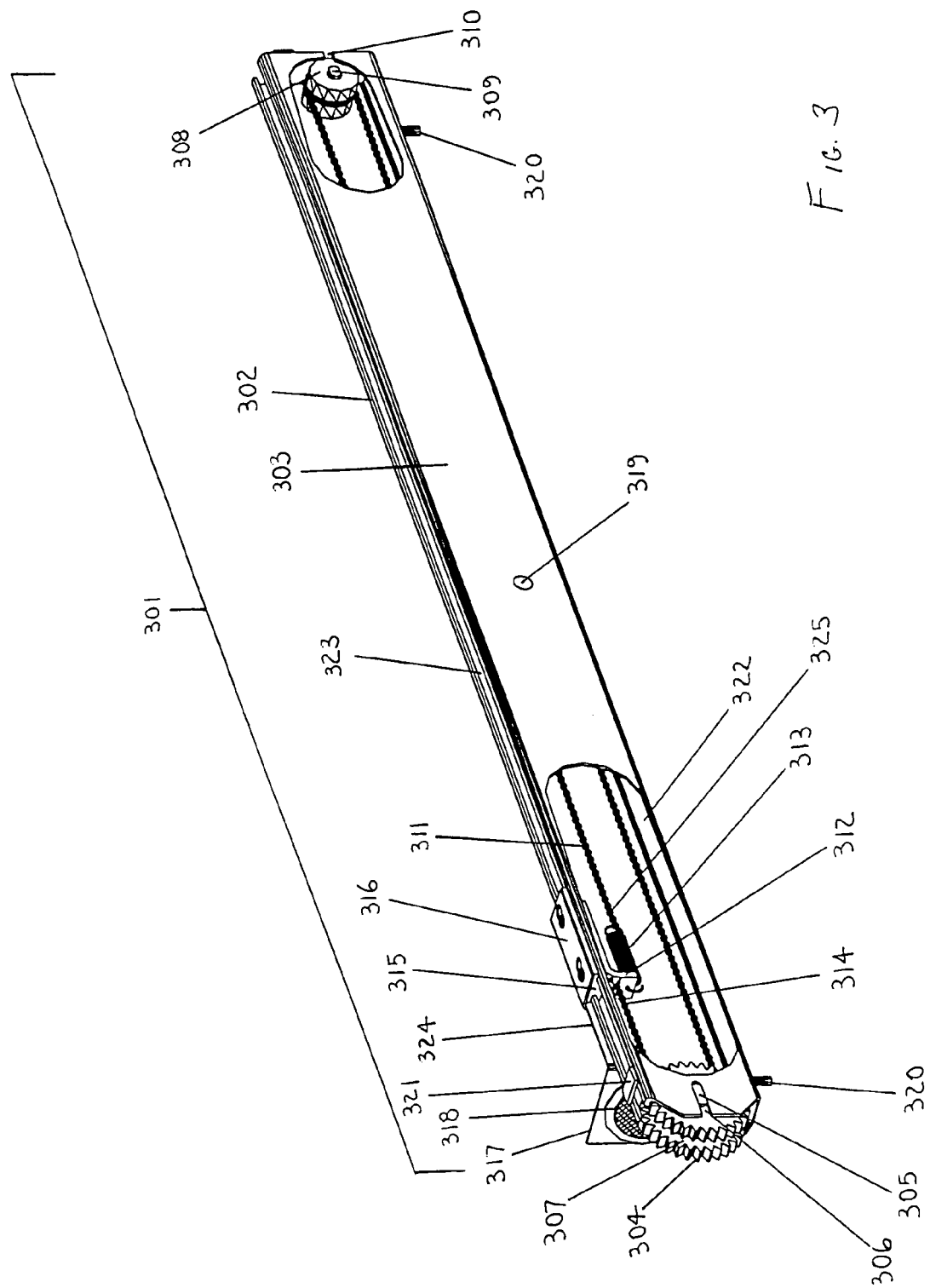
FIG. 3 shows an oblique view of a product separator/pusher.

FIG. 3 shows an oblique view of a product divider 301. Divider 301 serves to deliver the dispensed product to the transport bin 401 as well as to separate adjacent products on the shelves 105. The shelves 105 are provided at evenly spaced intervals with holes 803 (best seen in FIG. 8) for the placement of dividers 301. As can be seen in FIG. 3, divider 301 has two sides 302 and 303 joined by bottom 322. Sides 302 and 303 are separated at the top of divider 301 to form an open channel 323 in which a slider 315 may travel the length of divider 301. One or more interior support pins 319 stabilize divider 301. Two anchor pins 320 are mounted at the front and rear of divider 301 on its bottom 322 to locate and anchor divider 301 to a shelf 105. At the front end of divider 301 a bead chain gear pulley 304 is mounted on shaft 305 which is held in slot 306. Gear pulley 304 has a groove 307 extending part way down its middle sufficiently wide to accommodate bead chain 311. The interior base of groove 307 has hemispherical sockets to engage bead chain 311. At the rear of divider 301 bead chain pulley 308 is mounted on shaft 309 which is held in slot 310. Bead chain 311 encircles gear pulley 304 and pulley 308. One end 314 of chain 311 is attached to bracket 312 while the other end 325 of chain 311 is attached to spring 313. Spring 313 is also attached to bracket 312 and serves to provide constant tension on chain 311. Bracket 312 is rigidly mounted to the underside of slider 315. As can also be seen in FIG. 8, pusher arm 317 is attached to the top side of slider 315 through pusher arm extension 324 and mounting bracket 316. A light reflector 318 is mounted to the front surface of pusher arm 317. As gear pulley 304 rotates, it drives chain 311 around pulley 308 and moves slider 315 in channel 323. A stop 321 prevents slider 315 from advancing too far forward. Pusher arm 317 is thereby moved along the length of divider 301.

Figure 4:
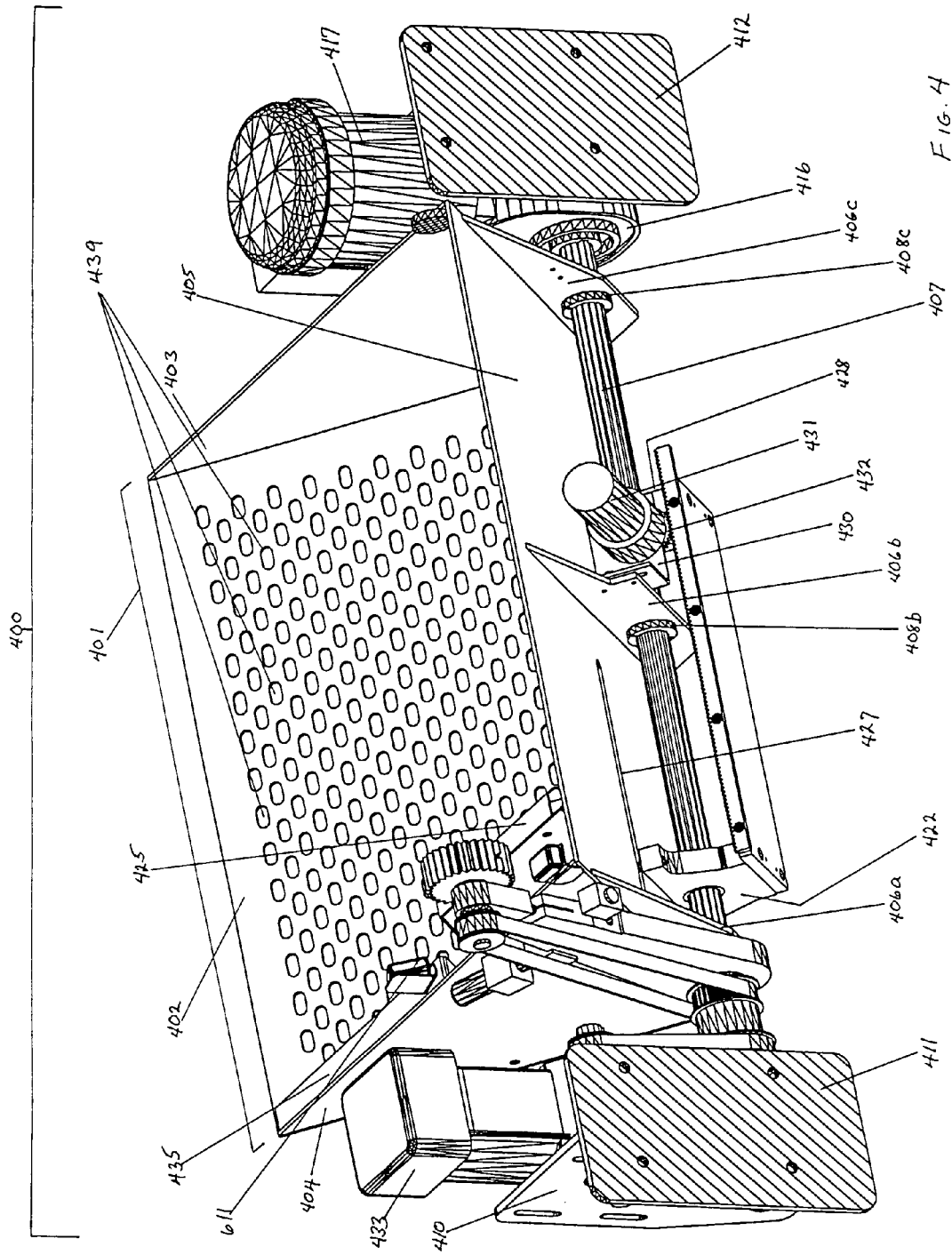
FIG. 4 shows an oblique view from slightly underneath of the details of the construction and assembly of the transporter assembly.
Figure 5:
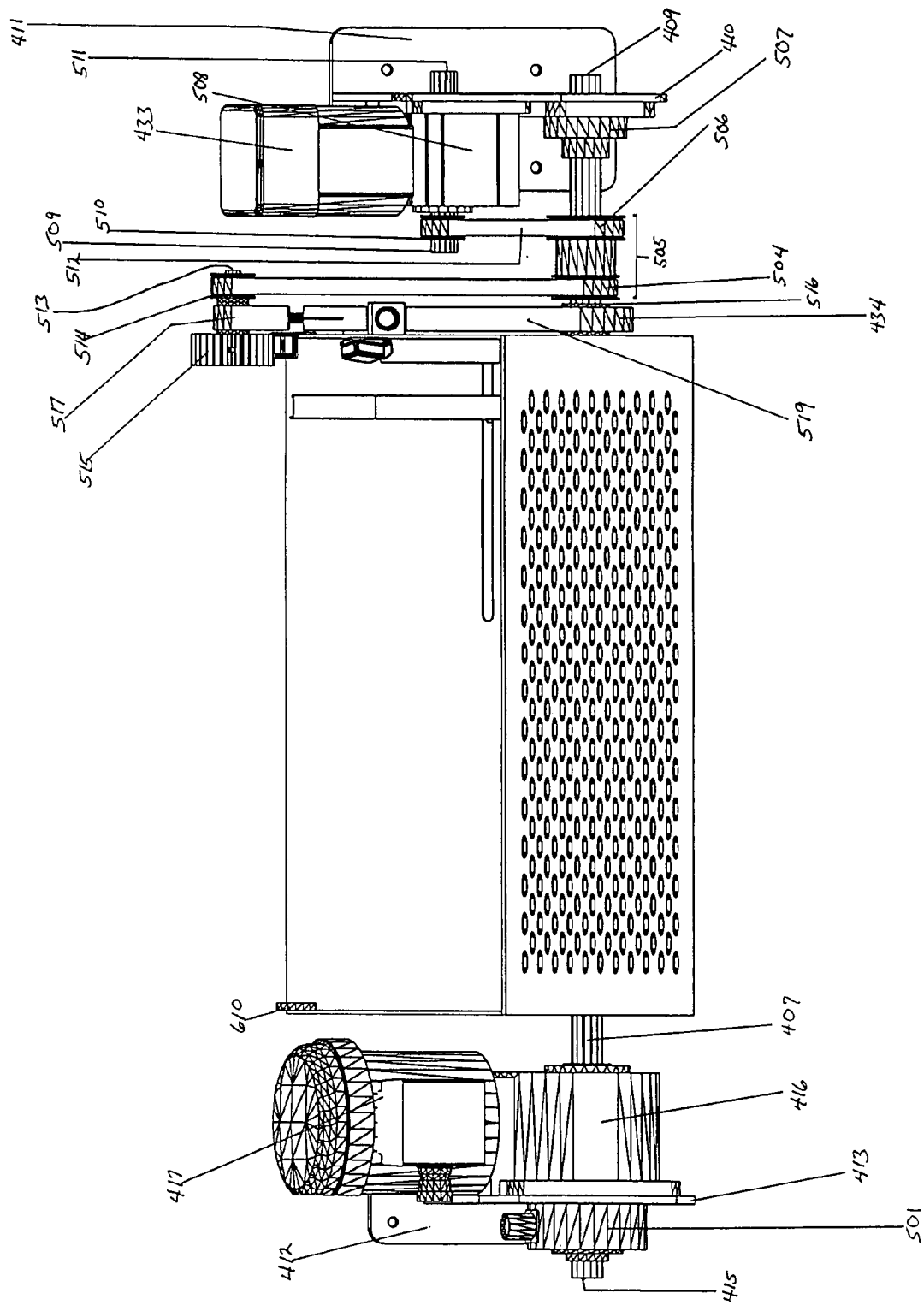
FIG. 5 is a frontal view of the transporter assembly.

FIG. 4 shows an oblique view of transporter bin assembly 400. Transporter bin assembly 400 provides a transporter bin 401 which has a front wall 402, two side walls 403 and 404, and a bottom wall 405. Multiple holes 439 are spaced across and through front wall 402. Holes 439 not only permit the customer to watch the vending of his/her selected products when the transporter 400 is at or above eye level, but also provide drainage for any leaking product containers when transporter 401 is in its docked and discharged positions. Attached to bottom wall 405 are three shaft brackets 406a, 406b, and 406c. A rotation shaft 407 passes through holes (not shown) in shaft brackets 406a, 406b, and 406c and extends beyond side walls 403 and 404 of bin 401. Shaft 407 is held rigidly attached to transporter bin 401 by clamps 408b and 408c attached to shaft brackets 406b and 406c. One end 415 of shaft 407 passes through a hollow bore gear motor 416, and then through a rotary encoder 501 as shown in FIG. 5. Shaft 407 is locked into gear box 416 by a shaft key (not shown). Gear box 416 is driven by motor 417. Gear box 416 is mounted to a left hand motor mount plate 413 which is a perpendicular integral extension of left hand X-Z drive mount plate 412. Drive mount plates 411 and 412 mount to the movable carriages 215 and 216 on vertical members 209 and 210 of carriage 211.

As shown in FIG. 5, one end 409 of shaft 407 passes through pusher gear drive arm 434, idler pulley 505, flange bearing 507, and through a hole (not shown) in right hand motor mount plate 410 which is a perpendicular integral extension of right hand X-Z drive mount plate 411. Idler pulley 505 freely rotates on shaft 407. Shaft 407 may be rotated about its cylindrical axis by motor 417 and hollow bore gear box 416 and is supported at end 409 by flange bearing 507.

Pusher motor 433 is mounted to right hand motor mount plate 410 and drives pusher gear box 508. One end 509 of dive shaft 511 extending from gear box 508 has a pulley 510 keyed to shaft 511. Pulley 510 is connected to one end 506 of idler pulley 505 by timing belt 512.

Pusher gear drive arm 434 is mounted on shaft 407 through bearing 516. A shaft 513 passes through a bearing (not shown) in the upper end 517 of pusher gear drive arm 434. Pulley 514 is keyed to one end of shaft 513 on one side of pusher gear arm 434. Pusher gear 515 is pinned to the other end of shaft 513 on the opposite side of pusher arm 434. Timing belt 519 connects one end 504 of idler pulley 505 to pulley 514. By these means, rotation of pulley 510 by motor 433 and gear box 508 is transferred through belt 512, idler pulley 505, belt 519, and pulley 514 to pusher gear 515.

Figure 6A:
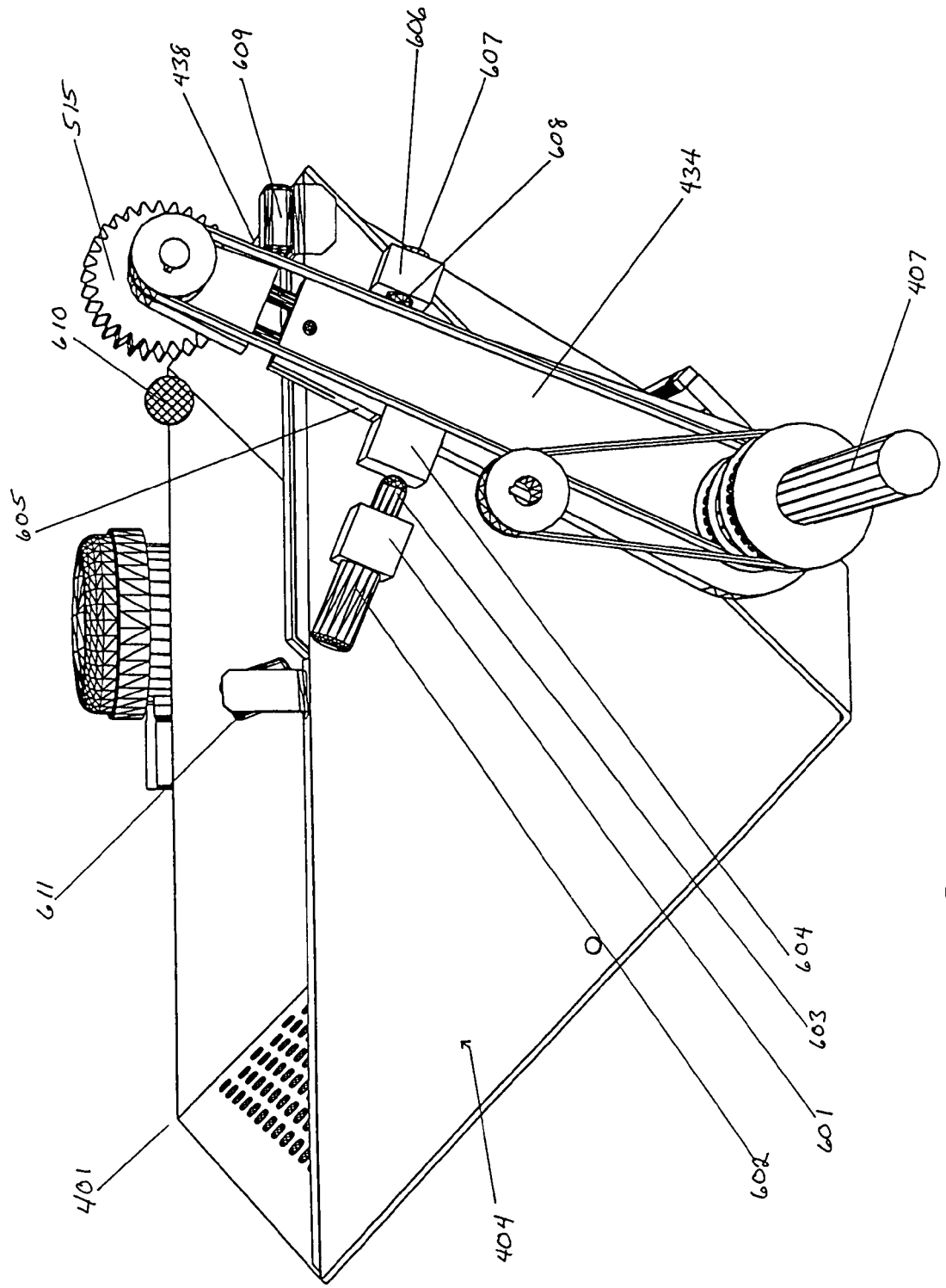
FIG. 6A is a partially cut away drawing showing the principal parts of the product pusher gear arm assembly.

FIG. 6A shows a cut-away drawing of pusher arm 434 on the end of transporter bin 401 without the pusher drive motor 433, gear box 508, shaft 509, and right hand motor mount plate 410 shown. While pusher gear drive arm 434 may freely rotate through bearing 516 on shaft 407, its motion is constrained. A spring plunger block 601 is rigidly attached to side 404 of transporter bin 401. A long stroke spring plunger assembly 602 is mounted within block 601 so that spring-loaded plunger 603 engages block 604 mounted on the side 605 of pusher gear arm 434. During product delivery, plunger 603 maintains firm engagement of pusher gear 515 and divider gear pulley 304. Another spring plunger block 606 is rigidly attached to side 404 of transporter bin 401 on the opposite side of arm 434 from block 601. A ball plunger assembly 607 is mounted within block 606 so that ball plunger 608 contacts the underside of pusher gear arm 434 when the transporter bin is in its travel position. Pusher gear arm 434 may only rotate about shaft 407 within the limits set by plungers 602 and 607.

A light source and photo detector unit 609 is mounted to side wall 404 of transporter bin 401. Detector unit 609 directs a light beam parallel to and substantially along rear edge 438 of transporter bin bottom 405 toward reflector 610. Another light source and photo detector unit 611 directs a light beam past pusher gear 515 across bottom edge 438 towards a position where reflector 318 mounted on pusher arm 317 would be positioned when transporter assembly 400 is in the dispensing position and no products remain on the shelf to block the light beam in front of pusher arm 317.

Referring to FIG. 4 and FIG. 6B, side wall 404 has a built-up wall extension 435 rigidly attached to it. Extension 435 covers approximately one-half of the area of side wall 404. The other half of the area of side wall 404 consists of a movable plate 425 of the same thickness as wall extension 435. In its fully retracted position, movable plate 425 aligns with extension 435 to form a continuous wall adjacent transporter bin side 404. Movable plate 425 is connected by two shoulder bolts 426 (only one bolt is shown in FIG. 6B) through two slots 427 (only one slot is shown in FIG. 6B) to slide plate 422 located on one side of shaft bracket 406b. Slide plate 422 has a bushing 424 through which shaft 407 freely passes. Another slide plate 428 with a similar bushing 424 (shown in FIG. 6B)) through which shaft 407 freely passes is located on the opposite side of shaft bracket 406b from slide plate 422. Spring plungers 612 in the surfaces 436 of slide plates 422 and 428 which contact the bottom surface 437 of transporter bin bottom 405 slidably stabilize the movement of slide plates 422 and 428. A carriage plate 419 is connected with fasteners 423 to slide plates 422 and 428. Fasteners 421 attach rack 420 to the side of carriage plate 419. Motor mounting plate 430 is rigidly attached to shaft bracket 406*b* on the same side of shaft bracket 406*b* as slide plate 428. Movable plate motor 431 mounts on bracket 430 and drives pinion gear 432 which engages rack 420. Movable plate motor 431 may rotate both clockwise and counter clockwise. As movable plate motor 431 drives pinion gear 432, movable plate 425 attached to slide plate 422 is moved across transporter bin 401 in slots 427.

Figure 6C:
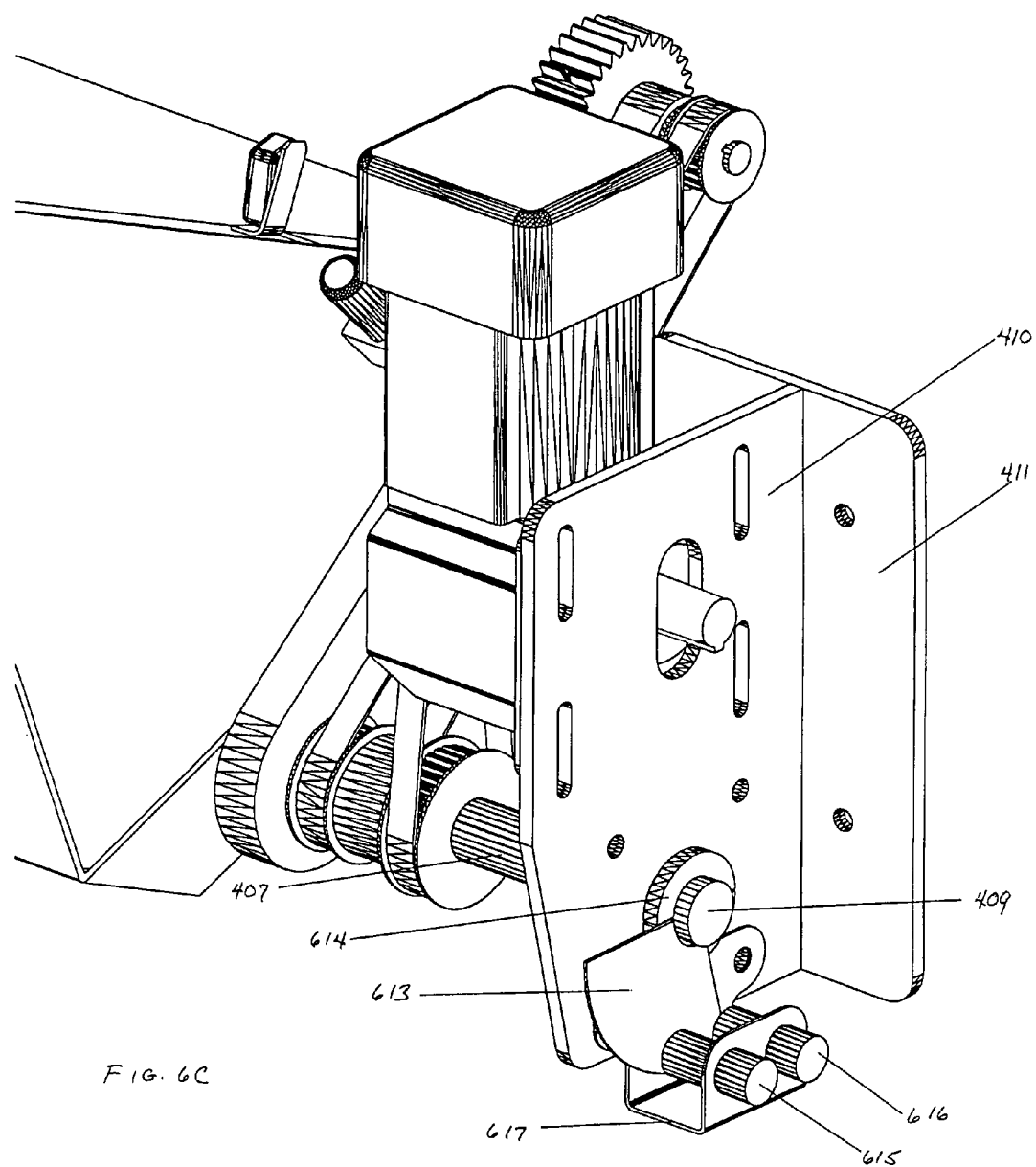
FIG. 6C is a side view of the right side of the transporter assembly showing the sector plate and sensors.

FIG. 6C is a view of the right side of transporter assembly 400. Sector plate 613 is attached to shaft 407 near its end 409 by shaft collar 614. Proximity sensors 615 and 616 are attached to mounting plate 617. The rotational position of shaft 407 is homed by the control computer at the end of each collection cycle with input from proximity sensors 615 and 616.

Figure 7B:
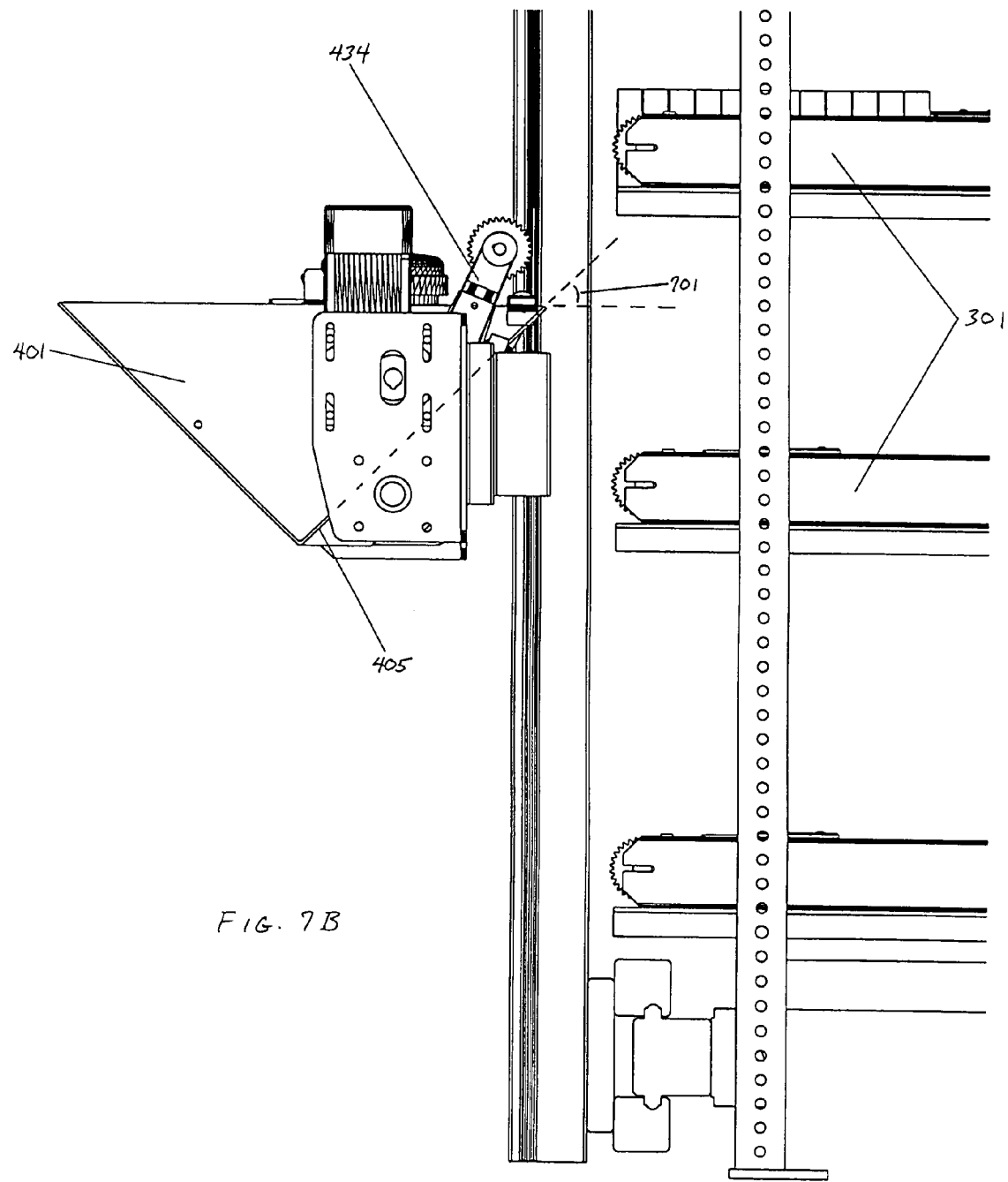
FIG. 7B is a partially cut away side view showing the tilt of the transporter bin.

FIG. 7A and FIG. 7B show the transporter assembly 400 on gantry 201 tilted in its travel position in front of product shelves 105. In FIG. 7B the right side vertical member 210 and carriage 216 are not shown so that the tilted position of transporter bin 401 may be seen more clearly. In the travel position, transporter bin 401 is rotated so that its bottom 405 is inclined at an angle 701 above the horizontal which is sufficient to provide clearance for pusher arm 434 so that pusher arm 434 does not hit any shelving or divider gears 304 as the transporter assembly is moved in the X-Z plane of the gantry to a product retrieval position. The angle required will depend on the size of the transporter bin and the distance between the bin and the shelving. In the preferred embodiment, angle 701 which transporter bin bottom 405 makes with the horizontal is approximately 45 degrees. Products previously dispensed into transporter bin 401 before the bin is rotated to its travel position remain at rest adjacent the front wall 402 of transporter bin 401 during travel as seen in FIG. 9 and FIG. 11.

FIG. 8A and FIG. 8B show transporter assembly 400 tilted for product delivery. In FIG. 8B the right side vertical member 210 and carriage 216 are not shown so that the tilted position of transporter bin 401 may be seen more clearly. The rear edge 438 of transporter bin bottom 405 is slightly below the top edge of shelf front 801 of product shelf 105. Only a small gap 802 separates transporter bin bottom 405 and shelf front 801. In the preferred embodiment of the invention, the bottom 405 of transporter bin 401 is tilted upwards above the horizontal by approximately 22 degrees. Pusher arm gear 515 is engaged with product pusher gear pulley 304. FIG. 9 shows a product 901 being dispensed from shelf 105 into transporter bin 401. Pusher gear 515 is in engagement with gear pulley 304. Rotation of gear 304 by pusher gear 515 advances pusher arm 903. Pusher arm 903 pushes the entire row of products forward forcing product 901 off of shelf 105 into transport bin 401. Once product 901 is no longer supported by shelf 105 it is supported in a tilted position by transporter bin 401 and slides down the bottom 405 of transporter bin 401 until it contacts the front wall 402.

FIG. 10 shows movable plate 425 advancing across transporter bin 401 and pushing product 901 across bin 401 out of the area 1001 adjacent bin wall 404 where dispensed products initially reside. Movable plate 425 is advanced after product 901 has been dispensed from shelf 105 and product 901 has slid down bin bottom 405 to rest against bin wall 402. FIG. 11 shows a second product 1101 which has just been dispensed into transporter bin 401 prior to movement of movable plate 425 and rotation of transporter bin 401 to the travel position. When movable plate 425 is activated, it will push product 1101 into product 901 causing both products to move across bin 401.

FIG. 12A and FIG. 12B show transporter assembly 400 docked in its product delivery position. In FIG. 12B the right side vertical member 210 and carriage 216 are not shown so that the docked position of transporter bin 401 may be seen more clearly. To accomplish delivery, transporter assembly 400 is initially moved to a position that is lower than delivery shroud 1201. Transporter bin 401 is then rotated so that front side 402, which is inclined during transport and product dispensing, is substantially horizontal. A delivery shroud 1201 rigidly attached to the door assembly baseplate 1207 below transaction center 106 has a shape which is complementary to the shape of transporter bin 401 so that together shroud 1201 and transporter bin 401 define an enclosed delivery area designated at 1208. A retractable door (not shown) lowers to permit customer access to delivery area 1208. A pressure sensitive switch (not shown) contacts pressure plate 1205 on the top edge of the door preventing closure of the door when anything causes plate 1205 to be displaced. Bag dispenser orifice 1203 is mounted on the inside wall 1204 of shroud 1201.

Figure 13A:
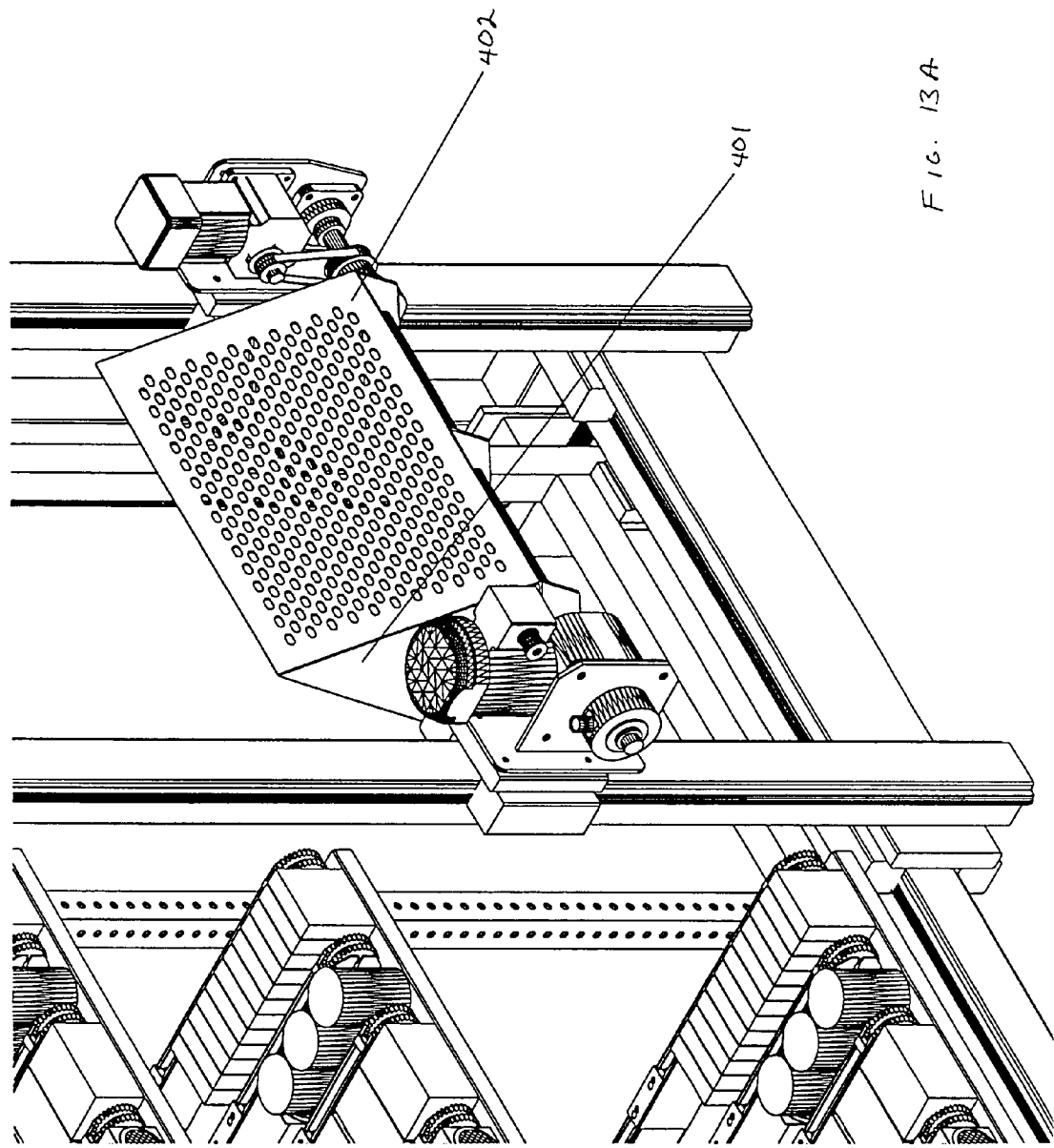
FIG. 13A is an oblique view showing the transporter bin rotated to discharge any unclaimed products left in the transporter assembly.

FIG. 13A shows transporter assembly 400 rotated to a discharge position. In FIG. 13B the right side vertical member 210 and carriage 216 are not shown so that the tilted discharge position of transporter bin 401 may be seen more clearly. Transporter bin 401 is rotated so that back side 405, which is inclined upwards above horizontal during transport and product dispensing so as to keep products in transporter bin 401, is rotated downward below the horizontal towards the rear of vending machine 101. In the preferred embodiment of the invention, angle 1301 is approximately 30 degrees.

Typically several horizontal shelves are arranged on the shelf frame 214 across the full width of the frame. Starting at the right hand edge of each shelf a product divider 301 is mounted in the holes in the shelf. The next divider 301 over is mounted so that the product to be vended by the first divider is loosely confined between the two dividers. Additional dividers 301 are placed on the shelf with spacing to accommodate each of the items to be vended. No restriction is placed by the design of the vending machine of the invention on the size of any item which may be adjacent to any other item. However, since the vertical spacing between shelves will depend on the height of the tallest product placed on any shelf, general consideration of maximizing the number of shelves which can be placed in the shelf frame, requires that the taller items be dispensed from the same shelf or shelves. In the preferred embodiment, products which could contaminate food products, i.e., motor oils, cleaning agents, etc., are dispensed in a separate delivery cycle from food products. Also in the preferred embodiment, the control computer can be set to: 1) selectively dispense any particular product in a separate delivery cycle; 2) not dispense products with designated expiration dates after their date of expiration; and 3) not dispense products which require refrigeration if the temperature rises at any time above an established limit.

Once the positions of the dividers 301 have been determined, the shelves 105 and dividers 301 define an X-Z matrix of products which may be dispensed. Each product can be identified by a matrix position notation. One such notation frequently used in the vending industry labels columns alphabetically and rows numerically. A product is defined by a column/row label. Alternatively, each matrix position may be assigned a numerical value which may or may not follow any particular scheme. For ease of customer use, adjacent products are usually numbered consecutively.

The identification of each product, the number of product items in a divider row, the width of each product, the price of each product, and the product matrix position are provided to the vending machine control computer. The positional information necessary for a product to be selected is the position of the divider which will dispense the product. This position is determined as a distance from a home (reference) position of the transporter assembly. Rotary encoders on the horizontal and vertical carriage motors provide positional information of the transporter assembly to the control computer. Control means for directing a carrier to a defined matrix position are well understood in the art. With this information, the computer directs the movement of the transporter assembly so that the pusher gear on the transporter assembly will engage the gear pulley on the divider.

The operation of the vending machine through a dispensing cycle begins with the insertion of a credit car, debit card or currency by the customer. In the preferred embodiment of the invention, a touch sensitive computer screens serves as the input device by which a customer communicates with the vending machine. Noting the matrix reference positions of the desired products, the customer inputs the selected items and quantity of each on the touch screen. Once the selections have been made, the customer then indicates acceptance by pressing "GO" on the touch screen. The entire transaction or any item selected may be canceled at any time prior to pressing "GO."

The control computer first ascertains that the transporter assembly 400 is at its reference location adjacent the delivery shroud 1201. The transporter bin 401 is rotated by motor 417 to its travel position shown in FIG. 7, rotational position being provided the control computer by rotary encoder 501. In the preferred embodiment of this invention, the bottom side 405 of transporter bin 401 is rotated to a 45 degree angle above the horizontal for travel. Horizontal 212 and vertical 213 drive motors are activated, translational position being provided the control computer by rotary encoders on each motor. Generally, if multiple products have been selected, the computer program directs that the first product to be dispensed is that which is farthest away from the home position, ie. nearest the upper left of the product matrix. However, if both food and non-food items have been selected, the food items will be gathered first. The transporter assembly carriages 211, 215 and 216 are moved so that transporter bin 401 is in front of the desired product on the shelf. More specifically, the transporter assembly 400 is moved so that the pusher gear arm 434 is directly in front of the divider 301 for the selected product.

At this point the movement of the transporter bin assembly 400 is stopped, and transporter bin 401 is rotated by motor 417 to the dispensing position shown in FIG. 8 so that the edge 438 of the bottom side 405 of transporter bin 401 is adjacent the front edge 801 of the shelf on which the product resides. In the preferred embodiment of this invention, the bottom side 405 of transporter bin 401 is rotated to a 22 degree angle above the horizontal for product delivery. This angle is shallow enough that dispensed products will not be damaged by sliding down the bottom side 405 of transporter bin 401 and steep enough that products will generally slide down bottom side 405 until coming to rest against front side 402 of transporter bin 401. Rotation of transporter bin 401 to the dispensing position engages pusher arm gear 515 and divider gear pulley 304. In the travel position, pusher arm 434 rests against spring-loaded plunger 608. As transporter bin 401 is rotated, the engagement of pusher arm gear 515 by gear pulley 304 causes pusher arm 434 to rotate about shaft 407 against spring-loaded plunder 603. Compression of the spring in plunger 603 positively biases pusher arm 434 and pusher gear 515 against gear pulley 304 so that adequate mechanical contact is maintained between the gears during the dispensing operation.

Before pusher motor 433 is activated, the status of photo detector 611 is checked. If light reflection from reflector 318 is detected, the dispensing operation is stopped, no charge is made to the customer for that product, and the system goes on to obtain the next product selected by the customer. Detection of a reflection by photo detector 611 occurs if no product rests in front of pusher arm 317 to be dispensed. The control computer will not attempt to dispense a product if the count in its available product register for a given matrix position indicates that all products from that position have been dispensed. The operation of photo detector 611 also prevents the system from attempting a dispensing operation from an empty product position.

If no signal from detector 611 is found, the control computer activates pusher motor 433. Pusher motor 433 drives pusher gear 515 to rotate gear pulley 304 thereby turning bead chain 311 and advancing pusher arm 317. Pusher arm 317 pushes product forward off the shelf onto transporter bin 401 as shown in FIG. 9. As the product is pushed off the shelf, the product interrupts the light beam between directed along edge 438 by light source and photo detector 609 which is reflected by reflector 610 located on the opposite side 403 of transporter bin 401. The interruption of the light beam indicates to the control computer that product is being dispensed. Once the product has left the shelf and moved into transporter bin 401, the light beam is no longer interrupted. Return of the light signal indicates to the control computer that the product has been dispensed into bin 401.

Movable wall motor 431 is activated driving movable wall 425 across transporter bin 401. The movement of movable wall 425 pushes the most recently dispensed product towards side wall 403 of transporter bin 401. There are two limitations to the extent of movement of movable wall 425. The first limitation is a limit on the extent of movement which can be achieved by the rack 420 and pinion gear 432 and length of slot 427. In the preferred embodiment, the extent of movement is sufficient to displace the widest object which will be dispensed from the shelves out of the way for the next object.

A second limitation is the total width of all products dispensed on a single cycle. This limitation only applies for dispensing cycles which obtain more than one product before delivery to the customer. The control computer tracks the accumulated width of all products dispensed in a cycle and will not move the movable wall closer to side wall 403 than the accumulated widths. After pushing the dispensed products towards side wall 403, motor 431 is reversed to return movable wall 425 to its home position adjacent side wall 404.

The dispensing action of the present invention which slides, rather than drops, products off the shelves and into the transporter bin allows for the dispensing of fragile products, as well as sturdy products, and the maintenance of the original quality and appearance of the products. Multiple products can be dispensed in a single collection cycle since each dispensed product is moved out of the way of the next dispensed product. No product is dropped upon another previously dispensed product. No more products are dispensed in a single collection cycle than can be safely accommodated by the width of the transporter bin; instead, the transporter will make multiple collection cycles to complete the customer order. Since products are delivered directly from the transporter bin to the customer through the access door, no damage is done to the products by delivery. In addition, the mechanism of the present invention with its wide transporter bin treats large and small products similarly.

After movable wall 425 returns to its home position, motor 417 rotates transporter bin 401 to its travel position. If more products are to be retrieved on the collection cycle, the transporter assembly 400 is moved to the next product position and the dispensing operation repeated. When all products have been retrieved, or when the transporter bin is full, the transporter assembly is moved underneath shroud 1201, motor 417 rotates transporter bin 401 so that its front side 402 is horizontal as shown in FIG. 12. The transporter assembly 400 is then raised and docked with shroud 1201. In this docked position, shroud 1201 and transporter bin 401 define an enclosed volume 1208. When customer access door 112 is then opened, the customer has access to the dispensed products but can not access the interior of the vending machine. The control computer leaves customer access door 112 open for a sufficient time for retrieval of the dispensed products. If the customer is still in the process of removing products when door 112 begins to close, pressure on bar 1205 activates a pressure switch which causes door 112 to cycle open again.

After delivery of dispensed products to the customer, transporter assembly 400 is lowered away from shroud 1201 and motor 417 rotates transporter bin 401 so that the edge 438 of bottom side 405 is declined below the horizontal. In the preferred embodiment, bottom side 405 is tipped down approximately 30 degrees. Any products or trash inadvertently or deliberately left in transporter bin 401 are discharged into a collection area of the vending machine 101. By this action, transporter bin 401 is kept clean and free of products and debris for the next collection cycle. The transporter bin 401 is maintained in the discharge attitude for a sufficient time to clear it and then returned to its travel position. If additional items still need to be obtained to complete the customer order, the collection cycle is repeated. Once all items have been delivered and the final discharge completed, the rotational position of transporter bin 401 is homed through information provided by proximity sensors 615 and 616, and transporter assembly 400 is returned to its docked position to await the next vending order.

Those skilled in the vending arts will recognize that various modifications, additions, substitutions and variations of the illustrative examples set forth herein can be made without departing from the spirit of the invention and are, therefore, considered within the scope of the invention.

We claim:

1. A computer implemented method for dispensing selected products from a vending machine in which products are retrieved by means of a product transporter comprising the following steps:
   A) determining which of the selected products can be dispensed together;
   B) determining whether any of the selected products can not be dispensed;
   C) determining if there is sufficient space in the product transporter in which to dispense the next selected product;
   D) if sufficient space in the product transporter for the next selected product does not remain, dispense the products in the product transporter and return to step C;
   E) moving the product transporter to the next product location;
   F) checking to confirm the actual presence of the product on the shelf;
   G) dispensing the product;
   H) moving any dispensed product already in the product transporter out of the dispensing area of the product transporter where the next selected product will be dispensed;
   I) if all products which were determined to be dispensed together is step A are not yet dispensed, repeating steps (C) through (H); and
   J) delivering the dispensed products.

2. The method of claim 1 in which the determination in step A of which products can be dispensed together is made on the basis of whether the product is a food or a non-food product.

3. The method of claim 1 in which the determination in step B of whether a product can be dispensed is determined by whether there are more of those products in the machine.

4. The method of claim 1 in which the determination in step B of whether a product can be dispensed is determined by whether the selected product is beyond the expiration date for that product.

5. The method of claim 1 in which the determination in step B of whether a product can be dispensed is determined by whether the storage temperature for the selected product has been exceeded before the dispensing of the product.

6. A computer implemented method for safely and gently dispensing products from a vending machine in which the products to be dispensed are arranged, separated by product dividers, across a plurality of vertically disposed shelves and are retrieved by means of a product transporter mounted on a movable gantry carriage, which moves the product transporter in an X-Z plane across the face of the shelving, comprising the following steps:
   A) moving a product transporter on the movable gantry carriage until a pusher arm gear on the transporter is substantially aligned with a product pusher pulley on a product divider on a shelf associated with the product to be dispensed;
   B) activating a first motor to rotate the product transporter about a substantially horizontal axis until simultaneously:
      (1) the bottom wall of the product transporter is inclined at an angle to a shelf edge so that dispensed product sliding down the bottom wall will not be damaged;
      (2) an edge of the bottom wall of the product transporter nearly touches the shelf on which the product to be dispensed rests just below the top of the shelf; and
      (3) a pusher arm gear engages a product pusher pulley on the product divider;
   C) activating a second motor to slowly drive the pusher arm gear and a product pusher pulley so that a product pusher advances the product to be dispensed off the edge of the shelf onto the bottom wall of the transporter bin;
   D) detecting the passage of the product off the shelf with a sensor mounted on the transporter bin;
   E) deactivating the second motor when the sensor indicates the product is off the shelf;

F) permitting the product to slide down the slightly inclined bottom wall of the transporter bin under the influence of gravity until it comes gently to rest against the front wall of the transporter bin;

G) activating the first motor to rotate about a substantially horizontal axis the transporter bin and pusher arm away from the shelf so that the bottom wall is in a more inclined position in which the dispensed product rests firmly under the influence of gravity against the front wall of the transporter bin;

H) moving the product transporter on the movable carriage until the transporter bin is slightly below a delivery station;

I) activating the first motor to rotate about a substantially horizontal axis the transporter bin so that the front wall of the bin is substantially level and the dispensed product rests on the front wall;

J) moving the product transporter to align with the delivery station; and

K) opening a delivery access door to permit the dispensed product to be retrieved from the product transporter.

7. The method of claim 6 in which multiple products can be gently and safely dispensed into the transporter bin before delivery comprising the further steps:

F') after step F activating a third motor to move a movable wall within the transporter bin to push the dispensed product across the bin and out of the path a next dispensed product would take, and then reversing the third motor to move the movable wall out of the way for the next dispensing operation;

G') after step G, repeating steps A through G' until all the products which will fit into the bin have been dispensed.

8. A computer implemented method for safely and gently dispensing multiple products from a vending machine in which products to be dispensed are arranged, separated by product dividers, across a plurality of vertically disposed shelves and are retrieved by means of a product transporter mounted on a movable gantry carriage, which gantry moves the product transporter in an X-Z plane across the face of the shelving into opposition with a product and a product divider, said method comprising the steps of:

A) associating with each product in a computer accessible product database the width of each product;

B) dispensing a first product into the transporter;

C) activating a wall motor to translate a movable wall within the transporter to push the dispensed product across the transporter and out of the path a next dispensed product would take, said wall being moved only so far as the space remaining after the addition of the dispensed product to the transporter permits;

D) reversing the wall motor to move the movable wall out of the way for the next dispensing operation;

E) determining if there is sufficient space left in the transporter for the next product to be dispensed by adding the width of the next product to be dispensed to the width of the previously dispensed product;

F) if there is not sufficient space, moving the transporter to the delivery station for delivery of the dispensed product;

G) repeating steps (B) through (F);

H) if there is sufficient space, dispensing the next product into the transporter;

I) activating a wall motor to translate the movable wall within the transporter to push the dispensed product across the transporter and out of the path a next dispensed product would take, said wall being moved only so far as the space remaining after the addition of the dispensed product to the transporter permits;

J) reversing the wall motor to move the movable wall out of the way for the next dispensing operation;

K) repeating steps (E) through (J) until there are no more products to be dispenses; and L) moving the transporter to the delivery station for delivery of the dispensed products.

* * * * *